United States Patent
Misra et al.

(10) Patent No.: US 7,412,020 B1
(45) Date of Patent: Aug. 12, 2008

(54) TRAINING FOR TIME-SELECTIVE WIRELESS FADING CHANNELS USING CUTOFF RATE

(75) Inventors: Saswat Misra, Potomac, MD (US); Ananthram Swami, Silver Spring, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 301 days.

(21) Appl. No.: 11/166,077

(22) Filed: Jun. 27, 2005

(51) Int. Cl.
*H04L 23/00* (2006.01)
(52) U.S. Cl. .................................................. 375/377
(58) Field of Classification Search .................. 375/316, 375/377, 295
See application file for complete search history.

(56) References Cited

U.S. PATENT DOCUMENTS 6,751,187 B2 * 6/2004 Walton et al. ............... 370/210
7,231,183 B2 * 6/2007 Pauli et al. ............... 455/67.11

OTHER PUBLICATIONS

Misra et al. "Cutoff Rate Analysis of the Gauss-Markov Fading Channel with Adaptive Energy Allocation," 2004, IEEE, pp. 388-392.*
Francesc et al., "A Robust Transmitter Design based on Cutoff Rate for MIMO Multicarrier System with Imperfect Channel Estimates," 2003, IEEE, pp. 528-532.*
Misra et al., "Optimal Training over the Gauss-Markov Fading Channel: A Cutoff Rate Analysis," Mar. 2004, IEEE, pp. 809-812.*
Phoel et al., "Performance of Coded DS-CDMA with Pilot Assisted Channel Estimation and Linear Interference Suppression," 2002, IEEE, pp. 822-832.*
Fraccesc et al., "Coded BER minimization for MIMO Multicarrier System with Imperfect Channel Estimates," 2004, IEEE, pp. 238-242.*
S. Adireddy, L. Tong, H. Viswanathan, "Optimal placement of training for frequency selective block-fading channels," IEEE Trans. Info. Theory, vol. 48, No. 8, pp. 2338-2353, Aug. 2002.
E. Arikan, "An upper bound on the cutoff rate of sequential decoding," IEEE Trans. Info. Theory, vol. 34, No. 1, pp. 55-63, Jan. 1988.
E. Baccarelli, "Bounds on the symmetric cutoff rate for QAM transmissions over time-correlated flat-fading channels," IEEE Trans. Comm. Letters, vol. 2, No. 10, pp. 279-28I, Oct. 1998.

(Continued)

*Primary Examiner*—Tesfaldet Bocure
(74) *Attorney, Agent, or Firm*—Edward L. Stolarun; Guy M. Miller

(57) ABSTRACT

The optimal allocation of resources—power and bandwidth—between training and data transmissions is considered for time-selective Rayleigh flat-fading channels under the cutoff rate criterion. The transmitter, assumed to have statistical channel state information (CSI) in the form of the channel Doppler spectrum, embeds known pilots symbols into the transmission stream. At the receiver, instantaneous, though imperfect, CSI is acquired through minimum mean square estimation of the channel based on some subset of pilot observations. The cutoff rate is computed and the optimal resource allocation is developed using, for example, a Gauss-Markov correlation model of a communication channel or a Jakes model.

10 Claims, 11 Drawing Sheets

OTHER PUBLICATIONS

J. Baltersee, G. Fock, H. Meyr, "An information theoretic foundation of synchronized detection," IEEE Trans. Comm., vol. 49, No. 12, pp. 2115-2123, Dec. 2001.

E. Biglieri, J. Proakis, and S. Shamai, "Fading channels: information-theoretic and communications aspects," IEEE Trans. Info. Theory, vol. 44, No. 6, pp. 2619-2692, Oct. 1998.

X. Cai and G. Giannakis, "Adapative PSAM accounting for channel estimation and prediction errors," IEEE Trans. Wireless Comm., vol. 4, No. 1, pp. 246-256, Jan. 2005.

J.K. Cavers, "An analysis of pilot symbol assisted modulation for Rayleigh fading channels [Mobile Radio]," IEEE Trans. Veh. Tech., vol. 40, No. 4, pp. 686-693, Nov. 1991.

M. Dong, L. Tong, and B. Sadler, "Optimal insertion of pilot symbols for transmissions over time-varying flat fading channels," IEEE Trans, on Signal Processing, vol. 52, No. 5, pp. 1403-1418, May 2004.

X. Dong and L. Xiao, "Symbol error probability of two-dimensional signaling in Ricean fading with imperfect channel estimation," IEEE. Trans. Vehicular Tech., vol. 54, No. 2, Mar. 2005.

M. Garcia and J. Paez-Borrallo, "Tracking of time misalignments for OFDM systems in multipath fading channels," IEEE Trans. Consumer Electronics, vol. 48, No. 4, pp. 982-989, Nov. 2002.

B. Hassibi and B. Hochwald, "How much training is needed in multiple-antenna wireless links?," IEEE Trans. Info. Theory, vol. 49, No. 4, pp. 951-963, Apr. 2003.

A. O. Hero and T.L. Marzetta, "Cutoff rate and signal design for the quasi-static Rayleigh fading space-time channel," IEEE Trans. Info. Theory, vol. 47, No. 6, pp. 2400-2416, Sep. 2001.

W. Kuo and M. P. Fitz, "Frequency offset compensation of pilot symbol assisted modulation in frequency flat fading," IEEE Trans. Comm., vol. 45, No. 11, pp. 1412-1416, Nov. 1997.

K. Leeuwin-Boulle and J. C. Belflore "The cutoff rate of time-correlated fading channels" IEEE Trans. Info. Theory, vol. 39, No. 2, pp. 612-617, Mar. 1993.

X. Ma, G. Giannakis, and S. Ohno, "Optimal training for block transmissions over doubly selective wireless fading channels," IEEE Trans. Signal Processing, vol. 51, No. 5, pp. 1351-1366, May 2003.

J. Massey, "Coding and moulation in digital communications," In Proc. 1974 Int. Zurich Seminar., Digital Communication, Mar. 1974.

R. McEliece and W. Stark, "Channels with block interference," IEEE Trans. Info. Theory, vol. 30, No. 1, pp. 44-53, Jan. 1984.

M. Medard, I. Abou-Faycal, and U. Madhow, "Adaptive Coding for Pilot Symbol Assisted Modulation Without Feedback," Proc. 38th Annual Allerton Conference on Communication, Control, and Computing, Oct. 2000.

M. Medard, "The effect upon channel capacity in wireless communications of perfect and imperfect knowledge of the channel" IEEE Trans. Info. Theory, vol. 46, No. 3, pp. 933-946, May 2000.

S. Ohno and G. Giannakis, "Average-rate optimal PSAM transmissions over time-selective fading channels," IEEE Trans. Wireless Comm., vol. 1, No. 4, pp. 712-720, Oct. 2002.

S. Ohno and G. Giannakis, "Capacity maximizing MMSE-optimal pilots for wireless OFDM over frequency-selective block Rayeligh-fading channels," IEEE Trans. Info. Theory, vol. 50, No. 9, pp. 2138-2145, Sep. 2004.

J. Proakis, Digital Communications, McGraw Hill, 2001 pp. 402-409.

M. Stojanovic, J. G. Proakis, and J. A. Catipovic, "Analysis of the impact of channel estimation errors on the performance of a decision-feedback equalizer in fading multipath channels," IEEE Trans. Comm., vol. 43, No. 2, pp. 877-886, Feb. 1995.

L. Tong, B. Sadler, and M. Dong, "Pilot-Assisted Wireless Transmissions," IEEE Signal Processing Magazine, pp. 12-25, Nov. 2004.

P. H.-Y. Wu and A. Duel-Hallen, "Multiuser detectors with disjoint Kalman channel estimators for synchronous CDMA mobile radio channels," IEEE Trans. Comm., vol. 48, No. 5, pp. 732-736, May 2000.

* cited by examiner

TRAINING FOR TIME-SELECTIVE WIRELESS FADING CHANNELS USING CUTOFF RATE

STATEMENT REGARDING FEDERALLY SPONSORED RESEARCH OR DEVELOPMENT

The invention described herein may be manufactured, used, and licensed by or for the United States Government.

TECHNICAL FIELD

The present invention is generally related to communications and, more particularly, is related to a system and method for improving the training of a wireless communication system using the cutoff rate.

BACKGROUND OF THE INVENTION

In wireless communications employing coherent detection, imperfect knowledge of the fading channel state imposes limits on the achievable performance as measured by, e.g., the mutual information, the bit-error rate (BER), or the minimum mean square error (MMSE). Typically, a fraction of system resources—bandwidth and energy—is devoted to channel estimation techniques (known as training) which improve knowledge of the channel state. Such schemes give rise to a tradeoff between the allocation of limited resources to training on one hand and data on the other, and it is natural to seek the optimal allocation of resources between these conflicting requirements. Such an optimization is of particular interest for rapidly varying channels, where the energy and bandwidth savings of an optimized scheme can be significant.

In this context, Pilot Symbol Assisted Modulation (PSAM) has emerged as a viable and robust training technique for rapidly varying fading channels. In PSAM, known pilot symbols are multiplexed with data symbols for transmission through the communications channel. At the receiver, knowledge of these pilots is used to form channel estimates, which aid the detection of the data both directly (by modifying the detection rule based on the channel estimate) and indirectly (e.g., by allowing for estimate-directed modulation, power control, and media access). PSAM has been incorporated into standards for IEEE 802.11, Global System for Mobile Communication (GSM), Wideband Code-Division Multiple-Access (WCDMA), and Military protocols, among others, and many theoretical issues are now being addressed. For example, optimized approaches to PSAM have recently been studied from the perspectives of frequency and timing offset estimation, BER, and the channel capacity or its bounds.

Current studies consider PSAM design for continuously time-varying, time-selective Rayleigh fading channels, under the channel capacity or its bounds. In each, the transmitter is assumed to have knowledge of the Doppler spectrum, and the receiver makes (instantaneous) MMSE estimates of the channel based on some subset of the pilot observations. In one study, three estimators (of varying complexity) are proposed and used to predict the channel state for a Gauss-Markov channel correlation model. Optimal binary inputs are used, and it is determined that for sufficiently correlated channels (i.e., slow enough fading), PSAM provides significant gains in the constrained capacity over the no pilot approach. Analysis was carried out through numerical simulation, and the optimization of energy between pilot and data symbols was not attempted.

However, in practice, there exists a need for analytic solutions that provide guidance on the optimal allocation of training and bandwidth. Any such algorithm can be sufficiently simple so as to be amenable to implementation in a consumer grade wireless device, such as a cellphone or personal digital assistant.

In other studies, authors assume a bandlimited Doppler spectrum and derive closed-form bounds on the channel capacity, using the estimator that exploits all past and future pilot observations. Closed-form results are derived for the optimal allocation of training and bandwidth in some cases.

However, in practice, the wireless communications channel available to the system designer is typically digitally sampled, and may not exhibit bandlimited Doppler spectra. Further, practical estimators are limited to using just a few past and future pilots, as using all past and future pilots is prohibitively complex and not feasible in real-world designs. Thus, a heretofore unaddressed need exists in the industry to address the aforementioned inadequacies.

SUMMARY OF THE INVENTION

Embodiments of the present invention provide a system and method for improved training for time-selective wireless fading channels using the cutoff rate. Briefly described, in architecture, one embodiment of the system, among others, can be implemented as follows. A receiver is adapted to sample a transmission on a communications channel. A processor is adapted to determine the cutoff rate of the communication channel corresponding to a sample of a transmission on the communication channel. A processor is adapted to allocate resources for the communication channel corresponding to maximization of the cutoff rate.

Embodiments of the present invention can also be viewed as providing methods of communications. In this regard, one embodiment of such a method, among others, can be broadly summarized by the following steps: determining the cutoff rate of a communication channel, and allocating resources (bandwidth and energy) for the communication channel corresponding to the maximization of the cutoff rate.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENT

Figure 1:
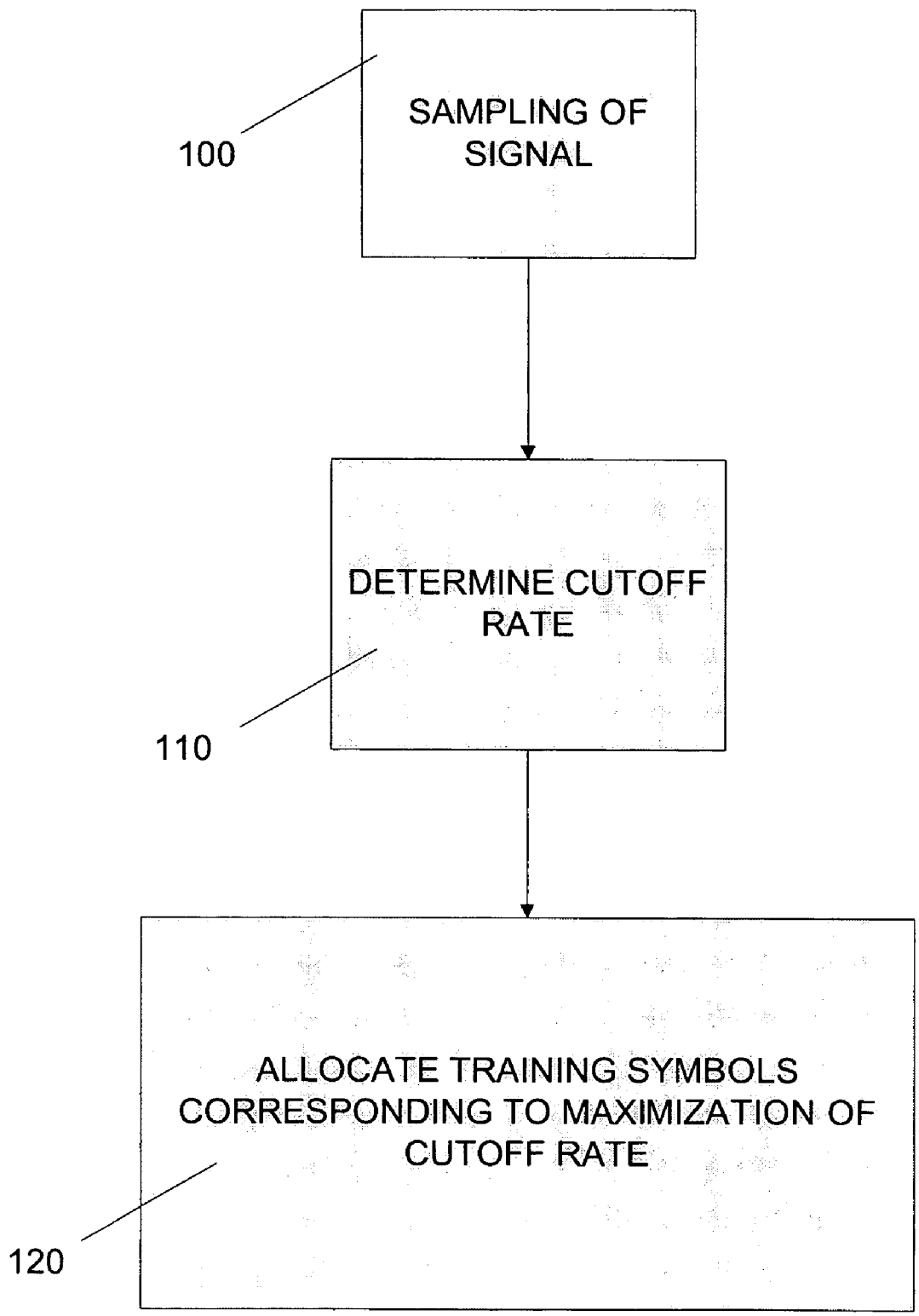
FIG. 1 is a block diagram of an exemplary embodiment of a method of communications.

To improve a PSAM design for time-selective Rayleigh fading, among other communication channels, the cutoff rate can be analyzed. The cutoff rate is a lower bound on the channel capacity and provides an upper bound on the probability of block decoding error (by bounding the random coding exponent). It has been used to establish practical limits on coded performance under complexity constraints, and can often be evaluated in closed-form when the capacity cannot. The cutoff rate with perfect receiver channel state information (CSI) has been examined with independent fading and with temporally correlated fading, and for no CSI multiple-input multiple-output (MIMO) systems, among others. This disclosure details a PSAM design from the cutoff rate perspective; however it is applicable to other communication system designs. Assuming M-PSK inputs, and a general class of MMSE estimators in which some subset of past and future pilots are exploited at the receiver, the interleaved cutoff rate is analyzed and applied to a transmission channel.

Many papers have been written in this area of communications including the following references: S. Adireddy, L. Tong, H. Viswanathan, "Optimal placement of training for frequency selective block-fading channels," *IEEE Trans. Info. Theory*, Vol. 48, No. 8, pp. 2338-2353, August 2002; E. Arikan, "An upper bound on the cutoff rate of sequential decoding," *IEEE Trans. Info. Theory*, Vol. 34, No. 1, pp. 55-63, January 1988; E. Baccarelli, "Bounds on the symmetric cutoff rate for QAM transmissions over time-correlated flat-fading channels," *IEEE Trans. Comm. Letters*, Vol. 2, No. 10, pp. 279-281, October 1998; J. Baltersee, G. Fock, H. Meyr, "An information theoretic foundation of synchronized detection," *IEEE Trans. Comm.*, Vol. 49, No. 12, pp. 2115-2123, December 2001; E. Biglieri, J. Proakis, and S. Shamai, "Fading channels: information-theoretic and communications aspects," *IEEE Trans. Info. Theory*, Vol. 44, No. 6, pp. 2619-2692, October 1998; X. Cai and G. Giannakis, "Adaptive PSAM accounting for channel estimation and prediction errors," *IEEE Trans. Wireless Comm.*, Vol 4., No. 1, pp. 246-256, January 2005; J. K. Cavers, "An analysis of pilot symbol assisted modulation for Rayleigh fading channels [Mobile Radio]," *IEEE Trans. Veh. Tech.*, Vol. 40, No. 4, pp. 686-693, November 1991; M. Dong, L. Tong, and B. Sadler, "Optimal insertion of pilot symbols for transmissions over time-varying flat fading channels," *IEEE Trans, on Signal Processing*, Vol. 52, No. 5, pp. 1403-1418, May 2004; X. Dong and L. Xiao, "Symbol error probability of two-dimensional signaling in Ricean fading with imperfect channel estimation," *IEEE. Trans. Vehicular Tech.*, Vol. 54, No. 2, March 2005; M. Garcia and J. Paez-Borrallo, "Tracking of time misalignments for OFDM systems in multipath fading channels," *IEEE Trans. Consumer Electronics*, Vol. 48, No. 4, pp. 982-989, November 2002; T. Kailath, A. Sayed, and B. Hassibi, *Linear Estimation*, Prentice Hall, 2000; W. C. Jakes, Jr., *Microwave Mobile Communication*. New York: Wiley, 1974; B. Hassibi and B. Hochwald, "How much training is needed in multiple-antenna wireless links?," *IEEE Trans. Info. Theory*, Vol. 49, No. 4, pp. 951-963, April 2003; A. O. Hero and T. L. Marzetta, "Cutoff rate and signal design for the quasi-static Rayleigh fading space-time channel," *IEEE Trans. Info. Theory*, Vol. 47, No. 6, pp. 2400-2416, September 2001; S. Jamali, and T. Le-Ngoc, *Coded-Modulation Techniques for Fading Channels*. Kluwer Academic Publishers, April 1994; S. Kay, *Fundamentals of Statistical Signal Processing*. Prentice Hall, 1993; W. Kuo and M. P. Fitz, "Frequency offset compensation of pilot symbol assisted modulation in frequency flat fading," *IEEE Trans. Comm.*, Vol. 45, No. 11, pp. 1412-1416, November 1997; K. Leeuwin-Boulle and J. C. Belflore "The cutoff rate of time-correlated fading channels" *IEEE Trans. Info. Theory*, Vol. 39, No. 2, pp. 612-617, March 1993; X. Ma, G. Giannakis, and S. Ohno, "Optimal training for block transmissions over doubly selective wireless fading channels," *IEEE Trans. Signal Processing*, Vol. 51, No. 5, pp. 1351-1366, May 2003; J. Massey, "Coding and modulation in digital communications," In *Proc. 1974 Int. Zurich Seminar., Digital Communication*, March 1974; R. McEliece and W. Stark, "Channels with block interference," *IEEE Trans. Info. Theory*, Vol. 30, No. 1, pp. 44-53, January 1984; M. Medard, I. Abou-Faycal, and U. Madhow, "Adaptive coded modulation without channel feedback for pilot symbol assisted modulation," *Proc. 38th Annual Allerton Conference on Communication, Control, and Computing*, October 2002; M. Medard, "The effect upon channel capacity in wireless communications of perfect and imperfect knowledge of the channel" *IEEE Trans. Info. Theory*, Vol. 46, No. 3, pp. 933-946, May 2000; S. Ohno and G. Giannakis, "Average-rate optimal PSAM transmissions over time-selective fading channels," *IEEE Trans. Wireless Comm.*, Vol 1., No. 4, pp. 712-720, October 2002; S. Ohno and G. Giannakis, "Capacity maximizing MMSE-optimal pilots for wireless OFDM over frequency-selective block Rayeligh-fading channels," *IEEE Trans. Info. Theory*, Vol 50., No. 9, pp. 2138-2145, September 2004; J. Proakis, *Digital Communications*, McGraw Hill, 2001; T. Rappaport, *Wireless Communications: Principles & Practice*, Prentice Hall, 1996; M. Stojanovic, J. G. Proakis, and J. A. Catipovic, "Analysis of the impact of channel estimation errors on the performance of a decision-feedback equalizer in fading multipath channels," *IEEE Trans. Comm.*, Vol. 43, No. 2, pp. 877-886, February 1995; L. Tong, B. Sadler, and M. Dong, "Pilot-Assisted Wireless Transmissions," *IEEE Signal Processing Magazine*, pp. 12-25, November 2004; J. M. Wozencraft and I. M. Jacobs, *Principles of Communication Engineering*, New York, Wiley, 1965; P. H.-Y. Wu and A. Duel-Hallen, "Multi-user detectors with disjoint Kalman channel estimators for synchronous CDMA mobile radio channels," *IEEE Trans. Comm.*, Vol. 48, No. 5, pp. 732-736, May 2000, which are incorporated by reference.

Wireless communications devices (e.g., cell phones) typically have limited energy available and operate under bandwidth constraints. In this setting, there is a fundamental tradeoff between spending the limited resources available (namely, energy and bandwidth) on training (which enables knowledge of the nature of the degrading communications channel) versus data symbols. If all resources are spent on training symbols, then accurate estimates of the degrading channel are obtained, and can be countered, but there are not any resources left to send data. Similarly, if all resources are spent sending data, no estimate of the nature of the degrading communications channel is obtained, and so the channel cannot be countered, making communications difficult. So there is an allocation to be made between training and data to improve the effectiveness of a communication channel.

Optimally allocating resources is useful because it results in a longer battery life and higher (coded) transmission rates. The disclosure describes an algorithm for the optimal allocation of these resources which is comprised of at least two parts:

(1) In a situation where a user has a battery with limited energy, how much power should be given to the training symbols (versus the data symbols)?

(2) In a situation where a device can only operate within a fixed bandwidth, how much bandwidth should be spent on training symbols (versus data symbols)? In other words, how frequently should training symbols be sent (e.g., should one training symbol be sent for every 5 data symbols, every 10 data symbols, etc.)?

There are at least two reasons why maximizing the cutoff rate is a sensible approach: (1) Maximizing the cutoff rate minimizes the probability of block error at the. (2) Maximizing the cutoff rate maximizes the code rate that can be used, while still being able to make the probability of block error at the receiver as small as desired (by using codes with longer and longer block lengths). This emanates from the cutoff rate's interpretation as providing an upper bound on the random coding exponent.

FIG. 1 presents a block diagram of an exemplary embodiment of such a communications process. First, in block 100, a transmission is sampled. This sample is used to determine the cutoff rate in block 110. In block 120, the training symbols are allocated corresponding to the maximization of the cutoff rate determination of block 110. Embodiments of such a communication process include but are not limited to a wireless radio, a cellular phone, wireless sensor networks, and wireless portable digital assistants.

Figure 2:
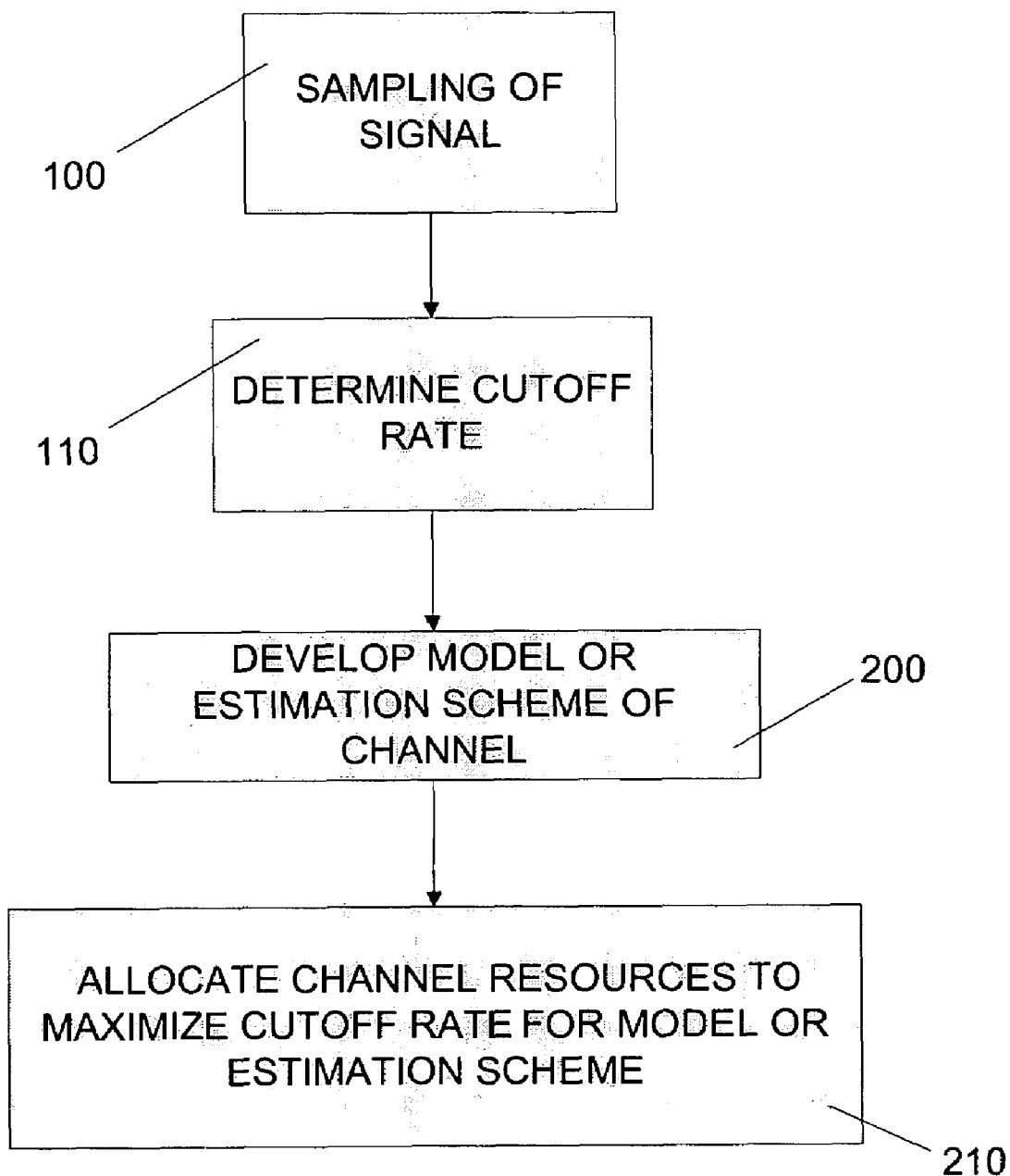
FIG. 2 is a block diagram of an exemplary embodiment of the allocation of training symbols of FIG. 1.

FIG. 2 presents a block diagram of an exemplary embodiment of the allocation process of block 120 in FIG. 1. First, as in FIG. 1, a transmission signal is sampled 100 and the cutoff rate is determined 110. To allocate the training symbols, first, in block 200, a model or estimation scheme of the communication channel is generated. Then, in block 210, the training symbols are allocated to maximize the cutoff rate as determined in block 110 for the model or estimation scheme that was generated in block 200. A detailed analysis of each of the steps of FIGS. 1 and 2 is provided below.

The following (standard) notation is used throughout the disclosure: x~CN(μ, Σ) denotes a complex Gaussian random vector x with mean μ and with independent real and imaginary parts, each having covariance matrix Σ/2; $\epsilon_x[.]$ is expectation with respect to the random variable X (the subscript X is omitted where obvious); superscripts "*", "t", and "H" denote complex conjugation, transposition, and conjugate transposition; IN is the identity matrix; |a| denotes the absolute value of the scalar a; |A| denotes the determinant of the matrix A; and |A| denotes the cardinality of the set.

In one embodiment, single-user communications are considered over a time-selective (i.e., temporally-correlated) Rayleigh flat-fading channel. The sampled baseband received signal $y_k$ (assuming perfect timing) is given by the scalar observation equation $$y_k = \sqrt{E_k} h_k s_k + n_k \quad (1)$$

where κ denotes discrete time, $s_k \in S_M \triangleq \{e^{j2\pi v/M}\}_{v=0}^{M-1}$ represents the M-PSK input, $E_k$ is the energy in the $k^{th}$ transmission slot, $h_k \sim CN(0, \sigma_h^2)$ models fading, and $n_k \sim CN(0, \sigma_n^2)$ models additive white Gaussian noise (AWGN). The normalized channel correlation function can be identified as $$R_h(\tau) \triangleq \frac{1}{\sigma_h^2} \epsilon[h_k h_{k+\tau}^*]$$

In PSAM, the transmitter embeds known pilot symbols into a transmission stream. Periodic PSAM in which pilots are embedded with period T are considered, so that $s_k = +1$ at times k=mT(m=0, ±1, ...). Because the allocation of energy to training versus data symbols entails a tradeoff, a different energy level corresponds to symbols for each. Define $$E_k \triangleq \begin{Bmatrix} E_P, & k = mT \\ E_D, & k \neq mT \end{Bmatrix}$$

where $E_P$ is the pilot symbol energy, and $E_D$ the data symbol energy. The received SNR can be described in the pilot and data slots as $$K_P \triangleq E_P \frac{\sigma_h^2}{\sigma_n^2} \text{ and } K_D \triangleq E_D \frac{\sigma_h^2}{\sigma_n^2} \quad (2)$$

In each time slot k=mT+l(m=0, ±1, ... ; 0≦l≦T-1), an MMSE (i.e., conditional-mean) estimate of the channel is made at the receiver using some subset of past, current, and future pilot symbol observations. The estimate at the $l^{th}$ lag from the most recent pilot can be described as $$\hat{h}_{mT+l} = \epsilon[h_{mT+l} | \{y_{(m+n)T}\}, n \in N] \quad (3)$$

where N is the subset of pilot indices used by the estimator. The |N| cardinality denotes the number of pilots used for estimation. Since $h_{mT+l}$ and $\{y_{(m+n)T}\}_{n \in N}$ are jointly Gaussian, the MMSE estimate of (3) is linear in the pilot observations, and therefore, also Gaussian. This leads to $$\hat{h}_{mT+l} = C_{h,y} C_{yy}^{-1} y \quad (4)$$

where $C_{h,Y}$ is the 1×|N| correlation vector between the estimate and observation, $C_{yy}$ the |N|×|N| observation covariance matrix, and y the |N|×1 observation vector, whose elements in the $i^{th}$ row and $j^{th}$ column are given by (1≦i, j≦|N|)

$(y)_{i,1} = y_{(m+N_i)T}$, $(C_{yy})_{i,j} = (\epsilon[yy^H])_{i,j} = E_P \sigma_h^2 R_h(|N_i - N_j|T) + \sigma_n^2 \delta(i-j)$, $(C_{hy})_{1,j} = (\epsilon[h_{mT+l} y^H])_{1,j} = \sqrt{E_P} \sigma_h^2 R_h(|l - N_j T|)$, where $N_v$ denotes the $v^{th}$ smallest element in N(v=1, ..., |N|), and where δ(.) is the Kronecker delta. It is useful to write the last two equations in the form $C_{yy} = \sigma_n^2 (K_P R_{hh} + I_{|N|})$, and $C_{hy} = \sqrt{E_P} \sigma_h^2 R_{hy}$, where definitions of the |N|×|N| matrix $R_{hh}$ and 1×|N| vector $R_{hy}$ are evident. Writing the system model in terms of the channel estimate $\hat{h}_k$ and estimation error $\tilde{h}_k \triangleq h_k - \hat{h}_k$, leads to $$y_k = \sqrt{E_k} \hat{h}_k s_k + \sqrt{E_k} \tilde{h}_k s_k + n_k \quad (5)$$

The estimate of (4) and estimation error $\tilde{h}_{mT+l}$ are independent (by application of the orthogonality principle, and it follows that $\hat{h}_{mT+l} \sim CN(0, \hat{\sigma}_{mT+l}^2)$ and $\tilde{h}_{mT+l} \sim CN(0, \sigma_h^2 - \hat{\sigma}_{mT+l}^2)$, where $\hat{\sigma}_{mT+l}^2 (0 \leq \hat{\sigma}_{mT=l}^2 \leq \sigma_h^2)$ is the estimator variance l positions from the most recent pilot. The performance of a particular estimator can be characterized by the normalized estimator variance, termed the CSI quality, and can be defined as $$\omega_l \triangleq \frac{\hat{\sigma}_{mT+l}^2}{\sigma_h^2} = \frac{C_{h_l y} C_{yy}^{-1} C_{h_l y}^H}{\sigma_h^2} = K_P R_{h_l y}(K_P R_{hh} + I_{|N|})^{-1} R_{h_l y}^H \quad (6)$$

Note that $\omega_l$ is not a function of m (steady state estimation is assumed), and that $\omega_l=0$ denotes no CSI, while $\omega_l=1$ denotes perfect CSI. It is assumed throughout that the transmitter has knowledge of $\omega_l$ the statistical quality of channel estimates, but not the instantaneous values $\hat{h}_{mT+l}$. Two subclasses of estimators lead to an accurate analysis of the cutoff rate: casual estimators and non-casual estimators.

In casual estimation, the (L, 0) estimator (L=1, 2, ...) is defined to be the estimator which uses the last L causal pilots, $N=\{-(L-1), -(L-2), \ldots 0\}$. For example, for the last pilot (1,0) estimator, $N=\{0\}$ and from (6), $$\omega_l^{(1,0)} = R_h^2(l) \frac{K_P}{1 + K_P} \quad (7)$$

In non-casual estimation, the (L, M) estimator is defined to be the noncausal estimator which uses the last L causal pilots and next M noncausal ones, i.e., $N=\{-(L-1), \ldots, 0, \ldots M\}$. For example, for the (1,1) estimator, $N=\{0,1\}$ and $$\omega_l^{(1,1)} = (\Gamma_{(l)}^2 + \Gamma_{(T-l)}^2)(K_P^2 + K_P) + 2K_P^2 \Gamma_{(l)} \Gamma_{(T-l)} R_h(T), \quad (8)$$

where $$\Gamma_{(k)} \triangleq \frac{R_h(k)(K_P + 1) - R_h(T) R_h(T-k) K_P}{(K_P+1)^2 - K_P^2 R_h^2(T)}$$

The communications system transmits codewords of length $N' \triangleq N(T-1)$ where $N>0$ is a positive integer. Without loss of generality, the codeword that starts at time $k=0$ can be denoted by $$S = diag\{[s_1 \ldots s_{T-1}, s_{T+1}, \ldots, s_{2T=1}, \ldots, s_{(N-1)T+1}, \ldots, s_{NT-1}]\}.$$

Also, let $$h \triangleq [h_1 \ldots h_{T-1}, h_{T+1}, \ldots, h_{NT-1}]^t,$$

$$\hat{h} \triangleq [\hat{h}_1 \ldots \hat{h}_{T-1}, \hat{h}_{T+1}, \ldots, \hat{h}_{NT-1}]^t, \text{ and}$$

$$\tilde{h} \triangleq [\tilde{h}_1 \ldots \tilde{h}_{T-1}, \tilde{h}_{T+1}, \ldots, \tilde{h}_{NT-1}]^t,$$

denote the channel, the channel estimate, and the estimation error during the span of the codeword. Normalized correlation matrices are defined for the channel estimate and estimation error, $$\hat{\Sigma} \triangleq \frac{1}{\sigma_h^2} \varepsilon[\hat{h}\hat{h}^H] \text{ and } \tilde{\Sigma} \triangleq \frac{1}{\sigma_h^2} \varepsilon[\tilde{h}\tilde{h}^H].$$

The observation of the codeword after transmission through the channel (see equation (5)) is $$y = \sqrt{E} S \hat{h} + \sqrt{E} S \tilde{h} + n \quad (9)$$

where $E \triangleq diag\{[E_1, \ldots, E_{T-1}]\} \otimes I_N$ is the energy matrix, with $\otimes$ denoting the matrix Kronecker product, and where the noise vector $n \triangleq [n_1 \ldots n_{T-1}, n_{T+1}, \ldots, n_{NT-1}]^t$. Note that the diagonal elements of $\hat{\Sigma}$ and $\tilde{\Sigma}$ are $1_N \otimes [\omega_1, \ldots, \omega_{T-1}]$ and $1_N \otimes [1-\omega_1, \ldots, 1-\omega_{T-1}]$, respectively, where $1^N$ is a row-vector of N ones.

A receiver may employ the Maximum Likelihood (ML) detector which may regard S as the channel input and the pair $(y,\hat{h})$ as the channel output. Among all possible input symbol sequences for S, denoted by S, the detector chooses a sequence which may maximize the posterior probability of the output, i.e., $$\max_{S \in S} P(y, \hat{h} | S) \quad (10)$$

where $P(.,.|.)$ is the probability distribution function (PDF) of the channel outputs, conditioned on the channel input. Noting that $P(y, \hat{h}|S) = P(y|S, \hat{h}) P(\hat{h})$ and using standard simplifications under Gaussian statistics, from (10), $$\max_{S \in S} \frac{\exp\left\{(y - \sqrt{E} S \hat{h})^H \left(\sigma_n^2 I_{N'} + \sigma_h^2 S \tilde{\Sigma} S^H\right)^{-1} (y - \sqrt{E} S \hat{h})\right\}}{\left|\sigma_n^2 I_{N'} + \sigma_h^2 S \tilde{\Sigma} S^H\right|}$$

The cutoff rate, measured in bits per channel use, is $$R_o = -\lim_{N \to \infty} \min_{Q(.)} \frac{1}{NT} \log_2 \int_y \int_{\hat{h}} \left[\sum_{S \in S} Q(S) \sqrt{P(y, \hat{h}|S)}\right]^2 d\hat{h} dy \quad (11)$$

where $Q(.)$ is the probability of transmitting a particular codeword.

Note that $$\int_y \int_{\hat{h}} \left[\sum_{S \in S} Q(S) \sqrt{P(y, \hat{h}|S)}\right]^2 d\hat{h} dy =$$

$$\sum_{V,W \in S} Q(V) Q(W) \varepsilon_{\hat{h}} \left[\int_y \sqrt{P(y|V, \hat{h}) P(y|W, \hat{h})} dy\right]$$

Also, that $y|V,\hat{h} \sim CN(u_V, \Sigma_V)$ and that $y|W, \hat{h} \sim CN(u_W, \Sigma_W)$ where $u_V \triangleq \sqrt{E} W \hat{h}$, $u_V \triangleq \sqrt{E} V \hat{h}$, $\Sigma_V \triangleq \sigma_h^2 E V \tilde{\Sigma} V^H + \sigma_n^2 I_{N'}$, and $\Sigma_W \triangleq \sigma_h^2 E \overline{W} \tilde{\Sigma} W^H + \sigma_n^2 I_{N'}$. Then, $$\int_y \sqrt{P(y|V, \hat{h}) P(y|W, \hat{h})} dy = \quad (12)$$

$$e^{\frac{1}{2}(u_V - u_W)^H (\Sigma_V + \Sigma_W)^{-1}(u_V - u_W)} \frac{|\Sigma_V|^{\frac{1}{2}} |\Sigma_W|^{\frac{1}{2}}}{\left|\frac{\Sigma_V + \Sigma_W}{2}\right|}$$

Next, the expectation of (12) is taken with respect to $\hat{h} \sim CN(0, \sigma_h^2 \hat{\Sigma})$, which leads to $$\frac{\left|\sigma_n^2 I_{N'} + \sigma_h^2 \sqrt{E} \, V \tilde{\sum} V^H \sqrt{E}\right|^{\frac{1}{2}} \left|\sigma_n^2 I_{N'} + \sigma_h^2 \sqrt{E} \, W \tilde{\sum} W^H \sqrt{E}\right|^{\frac{1}{2}}}{\left|\sigma_n^2 I_{N'} + \frac{1}{2}\sigma_h^2 \sqrt{E}(V\tilde{\sum} V^H + W\tilde{\sum} W^H)\sqrt{E} + \frac{1}{4}\sigma_h^2 \sqrt{E}(V-W)\tilde{\sum}(V-W)^H \sqrt{E}\right|}$$

Dividing the numerator and denominator by $\sigma_n^2$ and substituting the result into (11) yields $$R_o = - \lim_{N \to \infty} \min_{Q(.)} \frac{1}{NT} \log_2 \sum_{V,W} \sum_{\epsilon S} \frac{Q(V)Q(W) \left|I_{N'} + \sqrt{K} \, V \tilde{\sum} V^H \sqrt{K}\right|^{\frac{1}{2}} \left|I_{N'} + \sqrt{K} \, W \tilde{\sum} W^H \sqrt{K}\right|^{\frac{1}{2}}}{\left|I_{N'} + \frac{1}{2}\sqrt{K}(V\tilde{\sum} V^H + W\tilde{\sum} W^H)\sqrt{K} + \frac{1}{4}\sqrt{K}(V-W)\tilde{\sum}(V-W)^H \sqrt{K}\right|} \quad (13)$$

where $$K \triangleq \frac{\sigma_h^2}{\sigma_n^2} E$$

is the received energy matrix. Equation (13) can be used to determine optimal PSAM parameters and the resulting cutoff rate.

An interleaving-deinterleaving pair is an integral component of many wireless communications systems. A common assumption is that of infinite depth (i.e., perfect) interleaving, in which the correlation between channel fades at any two symbols within a codeword is completely removed. For example, this assumption has been used to study the cutoff rate of the time-selective fading channel with perfect CSI. Since channel realizations occurring exactly $l$ ($1 \leq l \leq T-1$) slots from the last pilot have the same estimation statistic $\omega_l$, these slots are assumed to be interleaved among each other (preserving the marginal statistics of the channel estimate and error). Further, the interleaving scheme is assumed to interleave adjacent subchannels with respect to each other. Perfect interleaving renders $\hat{\Sigma}$ and $\tilde{\Sigma}$ diagonal, so that $$\hat{\Sigma} = I_N \otimes diag\{ \omega_1, \ldots, \omega_{T-1}\} \text{ and}$$
$$\tilde{\Sigma} = I_N \otimes diag\{1-\omega_1, \ldots, 1-\omega_{T-1}\}$$

Each of the matrices in (13) is now diagonal. The cutoff rate simplifies to $$R_o = -\frac{1}{T}\sum_{l=1}^{T-1} \min \log_2 \sum_{s_l v_l \in} \sum_{S_M} Q_l(s_l)Q_l(v_l) \frac{\sqrt{1+K_D(1-\omega_l)|s_l|^2}\sqrt{1+K_D(1-\omega_l)|v_l|^2}}{1 + \frac{K_D}{2}(1-\omega_l)(|s_l|^2+|v_l|^2) + \frac{K_D}{4}\omega_l|s_l - v_l|^2}$$

where $Q_l(.)$ is the probability distribution $l$ slots from the last pilot ($1 \leq l \leq T-1$). The communications channel is symmetric in its input (MPSK), and so the cutoff rate is maximized by the equiprobable distribution $Q_l(.)$. Evaluating the double sum and invoking the constant modulus property of M-PSK yields $$R_o = -\frac{1}{T}\sum_{l=1}^{T-1} \log_2 \left[ \frac{1}{M} \sum_{m=0}^{M-1} \frac{1+K_D(1-\omega_l)}{1+K_D\left(1-\omega_l \cos^2\left(\frac{\pi m}{M}\right)\right)} \right] \quad (14)$$

Equation (14) can be interpreted as follows: the $l^{th}$ term in the above sum represents the cutoff rate of the $l^{th}$ data subchannel (conceptually consisting of all transmissions occurring $l$ slots after a pilot). Thus, (14) represents the cutoff rate of $T-1$ parallel subchannels, normalized by the factor $1/T$ to account for pilot transmissions. Because the temporal-correlation of the channel is exploited for channel estimation before deinterleaving, the cutoff rate depends on the CSI quality. Equation (14) represents the M-PSK cutoff rate under perfect interleaving for an arbitrary channel correlation $R_h(\tau)$, estimation scheme N, and power and bandwidth allocation ($\kappa_P, \kappa_D, T$).

Optimal PSAM parameters can be determined under energy and bandwidth constraints for a channel model, in particular for a correlation model of the communication channel. Two such models which are helpful in the analysis of the effects of the cutoff rate are the Gauss-Markov (GM) channel model and the Jakes Model. The correlation of the Gauss-Markov (GM) channel model is described by a first-order autoregressive (AR) process. The GM model has previously been used to characterize the effect of imperfect channel knowledge on the performance of decision-feedback equalization, mutual information, and minimum mean square estimation error of time-selective fading channels. The correlation is given by $$R_h(\tau) = \alpha^{|\tau|} \quad (0 < \alpha < 1) \quad (15)$$

where the $\alpha$ parameter is related to the normalized Doppler spread of the channel and is typically within the range $0.9 \leq \alpha < 0.99$. It will be seen that the GM model provides simple, closed-form, and intuitive expressions for the CSI quality of many estimators of interest (including those of infinite length) and leads to simple design rules for the optimal allocation of resources between training and data.

In one period of transmission, the total energy consumed is $\kappa_P+(T-1)\kappa_D$, and $K_P+K_D(T-1)\leq K_{av}T$, where $K_{av}>0$ is the allowable average energy per transmission (averaged over pilots and data). The inequality in the constraint will be met with equality since $R_o$ is increasing in both $\kappa_P$ and $\kappa_D$. Causal and non-causal estimators are considered separately.

For causal estimators ($N_{|N|}\leq 0$), the cutoff rate optimizing pilot energy $\kappa_P=\kappa_P^*$ can be given by a one dimensional optimization problem involving only the CSI quality in the pilot slot $\omega_0$ $$K_P^* = \arg\max_{0 \leq K_P K_{av}T} \left[ \frac{K_{av}T - K_P}{K_{av}T - K_P + (T-1)} \omega_0(K_P) \right] \quad (16)$$

where $\omega_0(\kappa_P)$ emphasizes dependency on $\kappa_P$. This is found by substituting for $\kappa_D$ in terms of the energy constraint into (14), and by the fact that $\omega_l = \alpha^{2l}\omega_0$ for any causal estimator.

The optimal pilot energy $\kappa_P^*$ is implicit in (16), as a particular estimator has not been specified (explicit expressions will be given in the examples below). However, when $|N|$ is finite, it is clear from the last equality in (6) that $\omega_0$ is a ratio of polynomials in $\kappa_P$. Consequently, maximization of (16) involves polynomial rooting to yield $$K_P^* = \{K_P : a_0 + a_1 K_P + a_2 K_P^2 + \ldots + a_Z K_P^Z = 0, \quad 0 \leq K_P \leq K_{av}T\} \quad (17)$$

where $a_0, \ldots, a_Z$ are coefficients to be determined. A sufficient condition for a closed-form solution is $Z \leq 4$. Next, the optimal training energy can be derived at low and high SNR.

To examine the low SNR setting, the analysis starts from (6)

$$\omega_0 = K_P R_{h_0 y}(K_P R_{hh} + I_{|N|})^{-1} R_{h_0 y}^H \quad (18)$$

$$\approx K_P R_{h_0 y}(I_{|N|} - K_P R_{hh}) R_{h_0 y}^H$$

$$\approx K_P R_{h_0 y} R_{h_0 y}^H = K_P \frac{1 - \alpha^{2TL}}{1 - \alpha^{2T}}$$

where the approximations hold as $\kappa_P \to 0$. Substitution of (18) into (16) yields $$\lim_{K_{av} \to 0} \frac{K_P^*}{K_{av}T} = \frac{1}{2}$$

which states that half of the total energy per period should be allocated to the pilot symbol.

At high SNR, the performance of any causal estimator converges to that of the (1,0) estimator. To see this, start from (6)

$$\omega_l = K_P \alpha^{2l} R_{h_l y}(K_P R_{hh} + I_{|N|})^{-1} R_{h_l y}^H \quad (19)$$

$$\approx \alpha^{2l} R_{h_l y} R_{hh}^{-1} R_{h_l y}^H = \alpha^{2l}$$

where the approximation holds as $\kappa_P \to \infty$, and where the specific tridiagonal structure of $R_{hh}^{-1}$ has been exploited to arrive at the last equality. Equation (19) matches (7) with (15) at high SNR. Intuitively, the channel state in the most recent pilot transmission $k=mT$ is found at high SNR, and this renders older pilots $k=(m-1)T, (m-2)T, \ldots$ irrelevant for prediction in the GM model of (15).

The fractional training energy for any causal estimator at high SNR can now be found by substituting (7) with (15) into (16), such that $$\lim_{K_{av} \to \infty} \frac{K_P^*}{K_{av}T} = \frac{1}{1 + \sqrt{T-1}} \quad (20)$$

The general properties of $\kappa_P^*$ for causal estimators are summarized in the left half of Table I.

TABLE I

| | Causal (L, 0) Estimators | Noncausal (L, M) Estimators |
|---|---|---|
| $\dfrac{K_P^*}{K_{av}T}$ | see (15) | see (23) |
| $K_{av} \to 0$ | $= \frac{1}{2}$ | $= \frac{1}{2}$ |
| $K_{av} \to \infty$ | $= \dfrac{1}{1+\sqrt{T-1}}$ | $\dfrac{1}{1+\sqrt{2(T-1)}} \leq (\cdot) \leq \dfrac{1}{1+\sqrt{T-1}}$ |

If $Z \leq 4$, for example, then closed-form expressions for the optimal training energy (over all SNR) exist. Of particular interest are the $(1,0)$ and $(\infty,0)$ estimators which represent the limiting cases of causal estimation. For the $(1,0)$ estimator, the CSI quality $\omega_0$ is given by (7) with (15). Substitution into (16) yields $$K_P^* = \begin{cases} \dfrac{\sqrt{(T-1)(K_{av}T+1)[(K_{av}+1)T-1]} - (K_{av}+1)T + 1}{T-2} & T > 2 \\ \dfrac{1}{2} K_{av}T & T = 2 \end{cases} \quad (21)$$

For the $(\infty,0)$ estimator, the CSI quality is found from (6) to be $$\omega_l^{(\infty,0)} = \alpha^{2l} \frac{K_P - 1 + \sqrt{(1+K_P)^2 + 4K_P \dfrac{\alpha^{2T}}{1-\alpha^{2T}}}}{k_P + 1 + \sqrt{(1+K_P)^2 + 4K_P \dfrac{\alpha^{2T}}{1-\alpha^{2T}}}} \quad (22)$$

where inversion of the infinite-dimension $C_{yy}$ matrix has been carried out using the spectral factorization technique. Substituting (22) to (16), as $\alpha \to 1$, the optimal training energy $\kappa_P^* \to 0$. This is because the $(\infty,0)$ estimator provides an infinite number of noisy observations of the time-invariant (in the $\alpha \to 1$ limit) channel. Each observation requires only a minuscule amount of energy in order to exploit the infinite (in the limit) diversity gain. As $\alpha \to 0$, $\kappa_P^*$ converges to the $\kappa_P$ of the $(1,0)$ estimator in (21) (this follows since $\omega_l^{(\infty,0)}$ converges to $\omega_l^{(\infty,0)}$): for a rapidly fading channel, only the most recent pilot proves useful. For arbitrary $\alpha$, the optimal training energy is found by solving (16) with (22). For brevity, the coefficient notation of (17) can be used, for which $$a_0^{(\infty,0)} = -K_{av}^2 T^2 [(K_{av}+1)T - 1]^2 \quad (23)$$

$$a_1^{(\infty,0)} = 2K_{av}T[(K_{av}+1)T - 1][(2K_{av}+1)T - 1]$$

$$a_2^{(\infty,0)} = -6K_{av}T[(K_{av}+1)T - 1]$$

$$a_3^{(\infty,0)} = \frac{4\alpha^{2T}}{1-\alpha^{2T}}(T-1)^2 + 2T(T-1) + 4K_{av}T$$

$$a_4^{(\infty,0)} = (T-2)T$$

Note that Z=4, leading to a closed-form solution. Properties of the (1,0) and (∞,0) estimators, representing the limited cases of causal estimation, are summarized on the left side of Table II.

TABLE II

|  | (1, 0) | (∞, 0) | (1, 1) | (∞, ∞) |
|---|---|---|---|---|
| $\frac{\kappa_P^*}{\kappa_{av}T}$ | see (20) | see (22) | = N/A | = N/A |
| $\alpha \to 0$ | no dependency | $\to \frac{\kappa_P^*}{\kappa_{av}T}$ of (1, 0) | $\to \frac{1}{1+\sqrt{\frac{(T-1)(\kappa_{av}T+1)}{T(\kappa_{av}+1)-1}}}$ | $\to \frac{\kappa_P^*}{\kappa_{av}T}$ of (1, 1) |
| $\alpha \to 1$ | no dependency | $\to 0$ | $\to \frac{1}{1+\sqrt{\frac{(T-1)(2\kappa_{av}T+1)}{T(\kappa_{av}+1)-1}}}$ | $\to 0$ |

Figure 3:
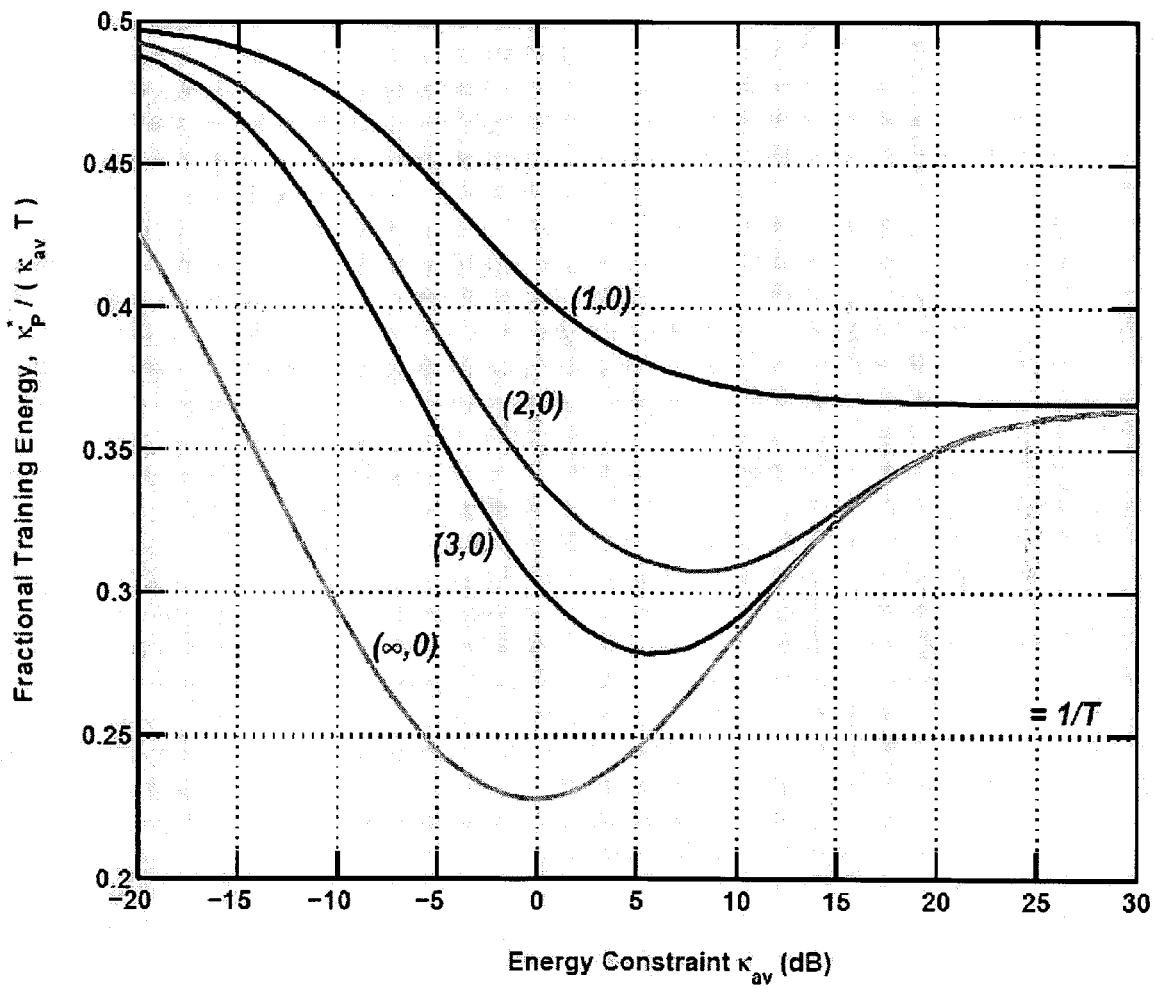
FIG. 3 is a graph of the fractional training energy for causal estimators in an exemplary embodiment of the allocation of training symbols of FIG. 2.

Referring to FIG. 3, the fractional training energy can be plotted for the (1, 0), (2, 0), (3,0) and (∞,0) estimators as a function of the energy constraint $\kappa_{av}$ for M=8, T=4, and $\alpha$=0.99. As more pilots are exploited, less training energy is required. The fractional training energy is non-monotonic in $\kappa_{av}$ for the multi-pilot estimators, though $\kappa_P^*$ is monotonic.

The optimal energy allocation is generally not available in closed-form for noncausal estimators ($N_{|N|}>0$). In general, it can be expressed as $$K_P^* = \arg \max_{K_P + K_D(T-1) = K_{av}T} R_o \quad (24)$$

First, by considering $\kappa_P^*$ in the limiting SNR cases, a closed-form solution at low SNR, and simple, but useful, bounds at high SNR are obtained. At low SNR, the CSI quality (6) is simplified using a technique similar to that used in (18) for causal estimators. It follows that $$\omega_l \approx \frac{1}{1-\alpha^{2T}}\left[\alpha^{2l}(1-\alpha^{2TL}) + \frac{\alpha^{2T}(1-\alpha^{2TM})}{\alpha^{2l}}\right]K_P$$

where the approximation holds as $\kappa_P \to 0$. Although this expression depends on l, substitution into (24) nevertheless yields a closed-form expression for $\kappa_P^*$. After taking the limit, $$\lim_{K_{av} \to 0} \frac{K_P^*}{K_{av}T} = \frac{1}{2},$$

implying once again that half of the available energy per period can be allocated to the pilot symbol at low SNR to improve performance.

At high SNR, the performance of any noncausal estimator converges to that of the (1,1) estimator (the proof is similar to the one used to derive (19) for causal estimators). Using this fact, (8) and (15) are substituted into (24), and the limiting cases of rapid ($\alpha \to 0$) and slow ($\alpha \to 1$) fading are considered, which provide upper and lower bounds on $\kappa_P^*$ to get $$\frac{1}{1+\sqrt{2(T-1)}} \le \frac{K_P^*}{K_{av}T} \le \frac{1}{1+\sqrt{T-1}} \quad (25)$$

where the lower bound is met with equality as $\alpha \to 1$, and the upper bound is met with equality as $\alpha \to 0$. Comparison of (25) to (20) reveals that a noncausal estimator may not use more training energy than a causal one at high SNR (for fixed T). General properties of $\kappa_P^*$ for noncausal estimators are summarized in the right half of Table I.

Another example begins with an analysis of the (1,1) estimator which is valid for all SNR. Simplifying (8) for the Gauss-Markov model leads to $$\omega_l^{(1,1)} = \frac{K_P^2(\alpha^{2l} + \alpha^{2(T-l)} - 2\alpha^{2T}) + K_P(\alpha^{2l} + \alpha^{2(T-l)})}{(K_P+1)^2 - K_P^2\alpha^{2T}}$$

Next, the CSI quality can be evaluated under rapid and slow fading. For rapid fading, $$\lim_{\alpha \to 0} \omega_l^{(1,1)} = \frac{K_P}{1+K_P}\max(\alpha^{2l}, \alpha^{2(T-l)}) \quad (26)$$

and for slow fading $$\lim_{\alpha \to 1} \omega_l^{(1,1)} = \frac{K_P}{\frac{1}{2}+K_P}, \forall l \quad (27)$$

Substitution of (26) and (27) into (24) yields closed-form solutions.

$$\frac{1}{1+\sqrt{\frac{(T-1)(2K_{av}T+1)}{T(K_{av}+1)-1}}} \leq \frac{K_P^*}{K_{av}T} \leq \frac{1}{1+\sqrt{\frac{(T-1)(K_{av}T+1)}{T(K_{av}+1)-1}}} \quad (28)$$

Figure 4:
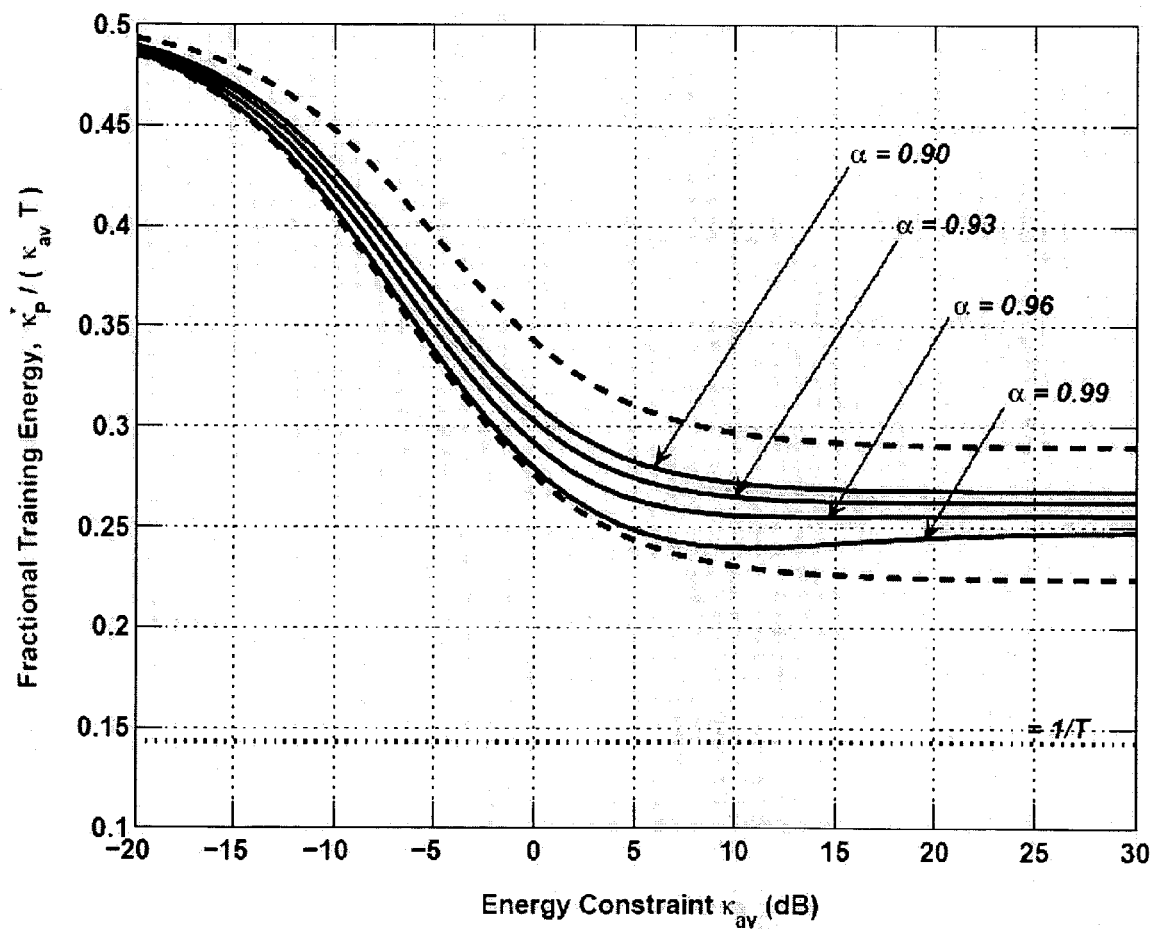
FIG. 4 is a graph of the fractional training energy for noncausal estimators in an exemplary embodiment of the allocation of training symbols of FIG. 2.

Referring to FIG. 4, the fractional training energy can be plotted for the (1,1) estimator as a function of the energy constraint $\kappa_{av}$ for several values of $\alpha$ when M=8 and T=7. Also shown (dashed lines) are the lower and upper bounds on $$\frac{K_P^*}{\kappa_{av}T}$$

from (28). Although the upper bound can be derived for the condition $\alpha \to 0$, it useful for the practical range of $\alpha$.

Figure 5:
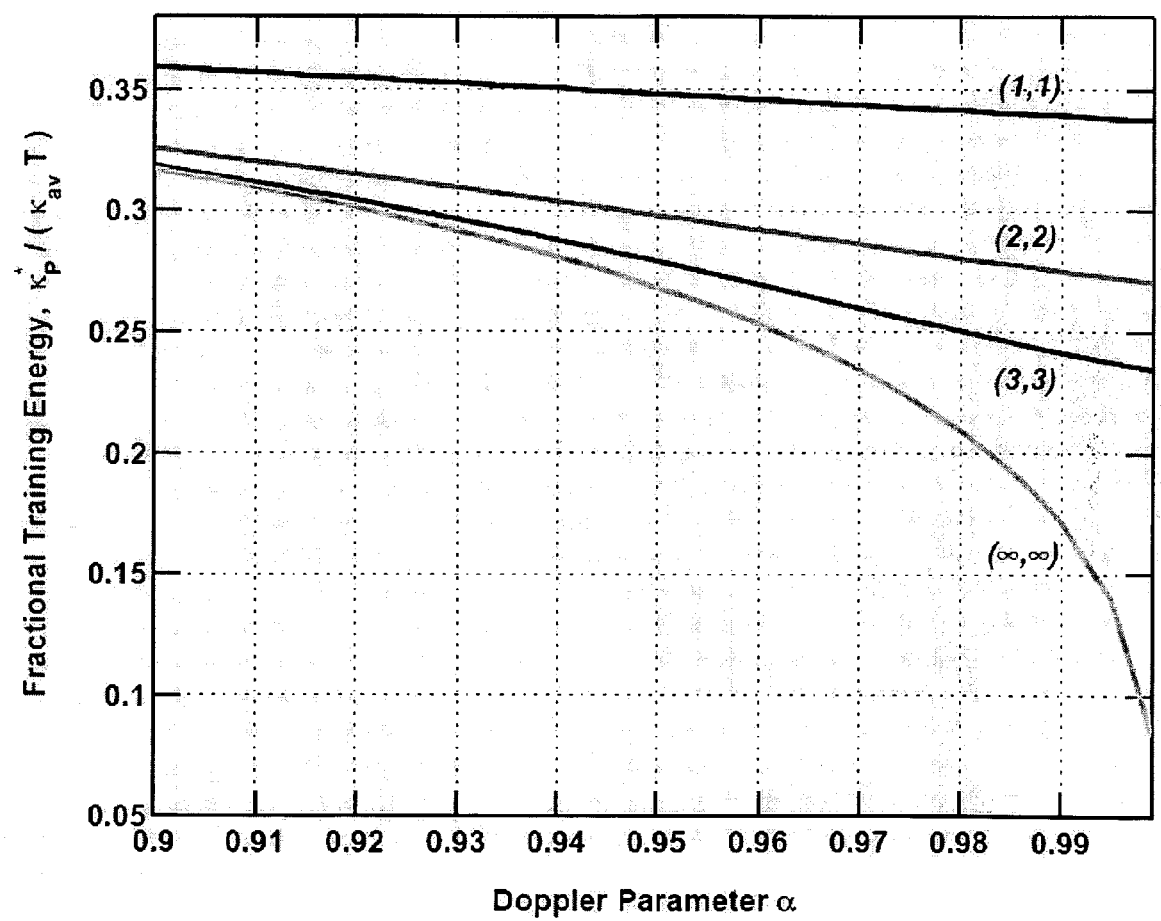
FIG. 5 is a graph of the fractional training energy versus Dopplar α in an exemplary embodiment of the allocation of training symbols of FIG. 2.

Next, the $(\infty, \infty)$ estimator can be considered. The CSI quality can be found to be $$\omega_l^{(\infty,\infty,)} = 1 - \frac{1+K_P+\alpha^{2T}(K_P-1)-K_P(\alpha^{2l}+\alpha^{2(T-l)})}{\sqrt{(1-\alpha^{2T})[(K_P+1)^2-(K_P-1)^2\alpha^{2T}]}} \quad (29)$$

which follows from (6) after applying spectral factorization. To determine bounds on the optimal training energy, the cases of slow and rapid fading can be considered. For slow fading, L'Hôpital's rule can be applied to (29) to obtain $$\lim_{\alpha \to 1} \omega_l^{(\infty,\infty,)} = 1, \, K_P > 0$$

and it follows from (24) that $\kappa_P^* \to 0$. For rapid fading ($\alpha \to 0$), $\omega_l^{(\infty,\infty)}$ converges to $\omega_l^{(1,1)}$ (i.e., to the expression on the right hand side of (26)). Therefore, $\kappa_P^*$ converges to the $\kappa_P^*$ of the (1, 1) estimator. Referring to FIG. 5, the fractional training energy $$\frac{K_P^*}{\kappa_{av}T}$$

versus Doppler $\alpha$ is plotted for the (1, 1), (2, 2), (3, 3) and $(\infty,\infty)$ estimators at an SNR of $\kappa_{av}=0$ when M=4 and T=4. For smaller values of $\alpha$, the (2, 2) estimator can provide most of the reduction in the required training energy, and gains can saturate with more sophisticated estimators. For large $\alpha$, the $(\infty,\infty)$ estimator takes advantage of the high-order diversity gain available over the slowly varying channel, and uses considerably less energy than the competing estimators. Properties of the (1, 1) and $(\infty,\infty)$ estimators, which represent the limiting cases of noncausal estimation, are summarized on the right side of Table II.

Next, the optimal period (equivalently, frequency) with which pilot symbols can be inserted into the symbol stream is considered. The optimal value of T can be related to the normalized Doppler $\alpha$, the cardinality of the input M, the energy constraint $\kappa_{av}$, the energy allocation (e.g., the optimal allocation or a static allocation $\kappa_D=\kappa_P=\kappa_{av}$), and the particular estimator employed at the receiver, among other factors. However, the analysis simplifies greatly in the high SNR setting. It is convenient to distinguish between the cases of causal and noncausal estimation.

At high SNR, the optimal training period for any causal estimator can be found from (14). Taking the argmax in T and letting $\kappa_{av} \to \infty$ leads to $$T_C \triangleq \arg\max_{2 \leq x < \infty, \, x \in Z+} \left[ \prod_{l=1}^{M-1} \frac{1}{M} \sum_{m=0}^{M-1} \frac{1-\alpha^{2L}}{1-\alpha^{2l}\cos^2\left(\frac{\pi m}{M}\right)} \right] \quad (30)$$

where the convergence of all causal estimators to the (1,0) estimator at high SNR can be used. Equation (30) depends only on M and $\alpha$; it can be independent of the particular estimator used and the energy allocation strategy. Although motivated by the high SNR setting, (30) provides an effective approximation to an optimal training period over a wide range of SNR.

Next, the applicability of the training period rule of (30) to (1, 0) and $(\infty,0)$ estimators at finite values of SNR can be analyzed. A comparison is given in Table III for QPSK (i.e., M=4). The second and third columns are the optimal training period for the (1, 0) estimator under the static and optimal energy allocations, respectively (determined numerically). The fourth and fifth columns are the training period for the $(\infty,0)$ estimator under static and optimal energy allocations (determined numerically), and the sixth column is the optimal training period at high SNR determined from (30). The optimal training period for either estimator, under either energy allocation strategy, is seen to converge to $T_C$ as the SNR increases, which is expected. It is seen that convergence occurs sooner when the fading becomes more rapid.

TABLE III

| | Causal Estimation | | | | | Noncausal Estimation | | | | |
|---|---|---|---|---|---|---|---|---|---|---|
| | $T_{(1,0)}$ | $T_{(1,0)}^*$ | $T_{(\infty,0)}$ | $T_{(\infty,0)}^*$ | $T_C$ | $T_{(1,1)}$ | $T_{(1,1)}^*$ | $T_{(\infty,\infty)}$ | $T_{(\infty,\infty)}^*$ | $T_{NC}$ |
| | | | | | $\alpha = 0.80$ | | | | | |
| $\kappa_{av} = 0$ dB | 3 | 3 | 3 | 3 | 3 | 3 | 4 | 3 | 3 | 3 |
| $\kappa_{av} = 10$ dB | 3 | 3 | 3 | 3 | 3 | 3 | 3 | 3 | 3 | 3 |
| $\kappa_{av} = 20$ dB | 3 | 3 | 3 | 3 | 3 | 3 | 3 | 3 | 3 | 3 |

TABLE III-continued

| | Causal Estimation | | | | | Noncausal Estimation | | | | |
|---|---|---|---|---|---|---|---|---|---|---|
| | $T_{(1,0)}$ | $T_{(1,0)}^*$ | $T_{(\infty,0)}$ | $T_{(\infty,0)}^*$ | $T_C$ | $T_{(1,1)}$ | $T_{(1,1)}^*$ | $T_{(\infty,\infty)}$ | $T_{(\infty,\infty)}^*$ | $T_{NC}$ |
| $\alpha = 0.95$ | | | | | | | | | | |
| $\kappa_{av} = 0$ dB | 5 | 8 | 4 | 5 | 4 | 6 | 10 | 5 | 7 | 5 |
| $\kappa_{av} = 10$ dB | 4 | 4 | 4 | 4 | 4 | 5 | 6 | 5 | 6 | 5 |
| $\kappa_{av} = 20$ dB | 4 | 4 | 4 | 4 | 4 | 5 | 5 | 5 | 5 | 5 |
| $\alpha = 0.99$ | | | | | | | | | | |
| $\kappa_{av} = 0$ dB | 10 | 20 | 6 | 10 | 7 | 12 | 28 | 8 | 16 | 10 |
| $\kappa_{av} = 10$ dB | 8 | 9 | 7 | 8 | 7 | 11 | 14 | 10 | 13 | 10 |
| $\kappa_{av} = 20$ dB | 7 | 7 | 7 | 7 | 7 | 10 | 11 | 10 | 11 | 10 |

For example, for $\alpha=0.80$ the training period predicted by (30) is correct for SNRs as small as 0 dB (for either the (1, 0) or ($\infty$,0) estimators and under either energy allocation strategy). For $\alpha=0.95$, $T_C$ can be exact for SNRs as low as 10 dB, and for $\alpha=0.99$, $T_C$ can be correct to an SNR of 20 dB. For a fixed estimator, the optimal training period can vary greatly depending on the energy allocation strategy—at least for smaller $\kappa_{av}$ and larger $\alpha$. For example, when $\alpha=0.99$ and $\kappa_{av}=0$ dB, the optimal training period varies from 10 (under constant allocation) to 20 (under optimal allocation).

Similarly, the optimal training period can be analyzed for any noncausal estimator by considering the high SNR setting. Letting $\kappa_{av} \to \infty$ in (14), leads to $$T_{NC} \triangleq \arg\max_{2 \leq x < \infty, x \in \mathbb{Z}_+} \left[ \prod_{l=1}^{x-1} \frac{1}{M} \sum_{m=0}^{M-1} \frac{(1-\alpha^{2l})(1-\alpha^{2(x-l)})}{1-\alpha^{2x}-(\alpha^{2l}+\alpha^{2(x-l)}-2\alpha^{2x})\cos^2\left(\frac{\pi m}{M}\right)} \right]^{\frac{-1}{x}} \quad (31)$$

The right side of Table III illustrates the training period for noncausal estimators. The seventh and eighth columns of the table are the optimal training period for the (1, 1) estimator under static and optimal energy allocations, respectively (determined numerically). The ninth and tenth columns are the training period for the ($\infty$,$\infty$) estimator under static and optimal energy allocations (determined numerically), and the eleventh column is the optimal training period at high SNR determined from (31). $T_{NC}$ provides an effective approximation to the optimal training period for larger SNR and for more rapid fading. The table reflects intuition: the more predictable the channel (larger $\alpha$), the less frequently training is required (larger T). However, the table generally indicates that more sophisticated estimators (e.g., ($\infty$,$\infty$,)) can require more frequent training symbols than simpler ones (e.g., the (1, 1)). Equation (14) shows that the optimal T can be determined not directly by the quality of the estimator, but rather by how quickly the cutoff rate in the $l^{th}$ subchannel diminishes in $$l\left(1 \leq l \leq \left\lceil \frac{T-1}{2} \right\rceil\right)$$

for noncausal estimators). If the better estimator causes the biased sum of (14) to degrade more quickly in l, then T can be smaller for the better estimator.

Figure 6:
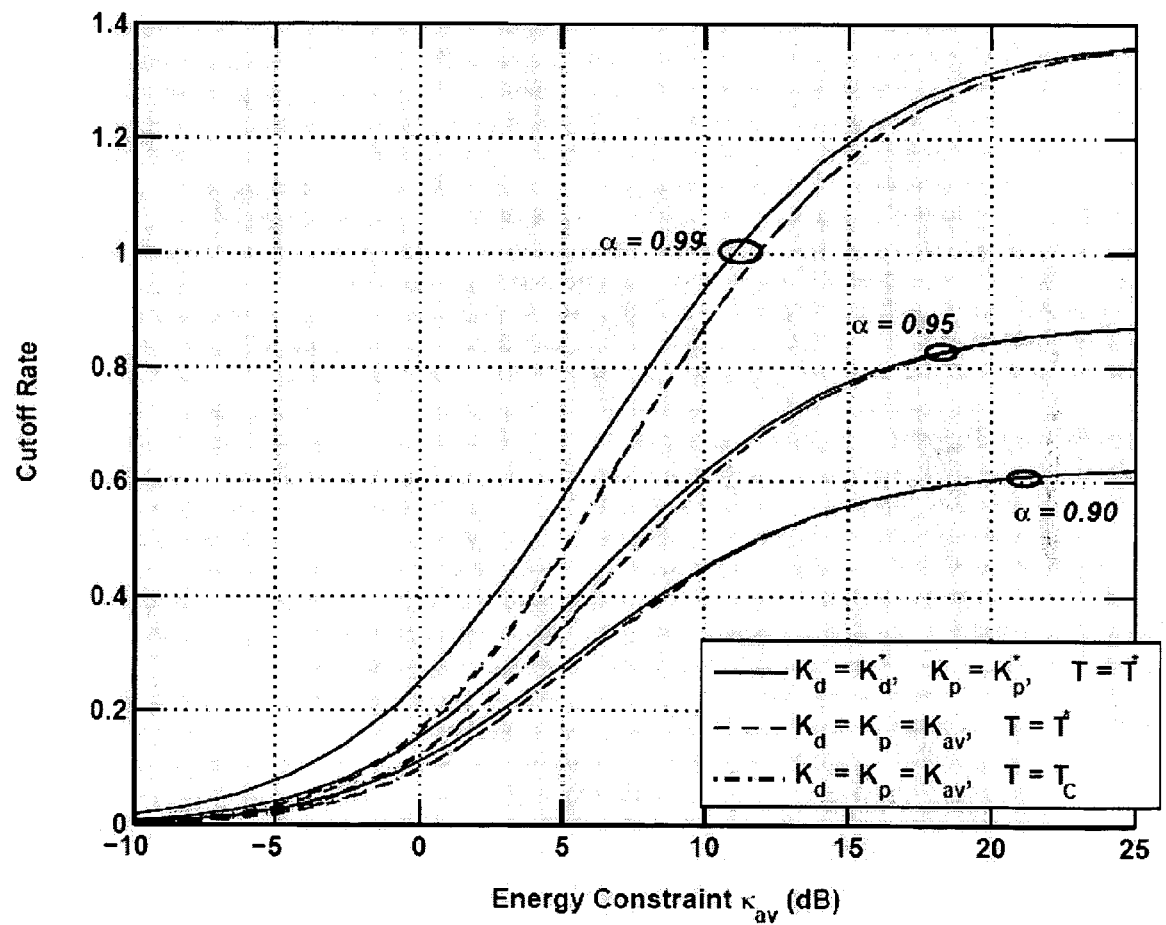
FIG. 6 is a graph of the QPSK cutoff rate of an exemplary embodiment in the allocation of training symbols of FIG. 2.
Figure 7:
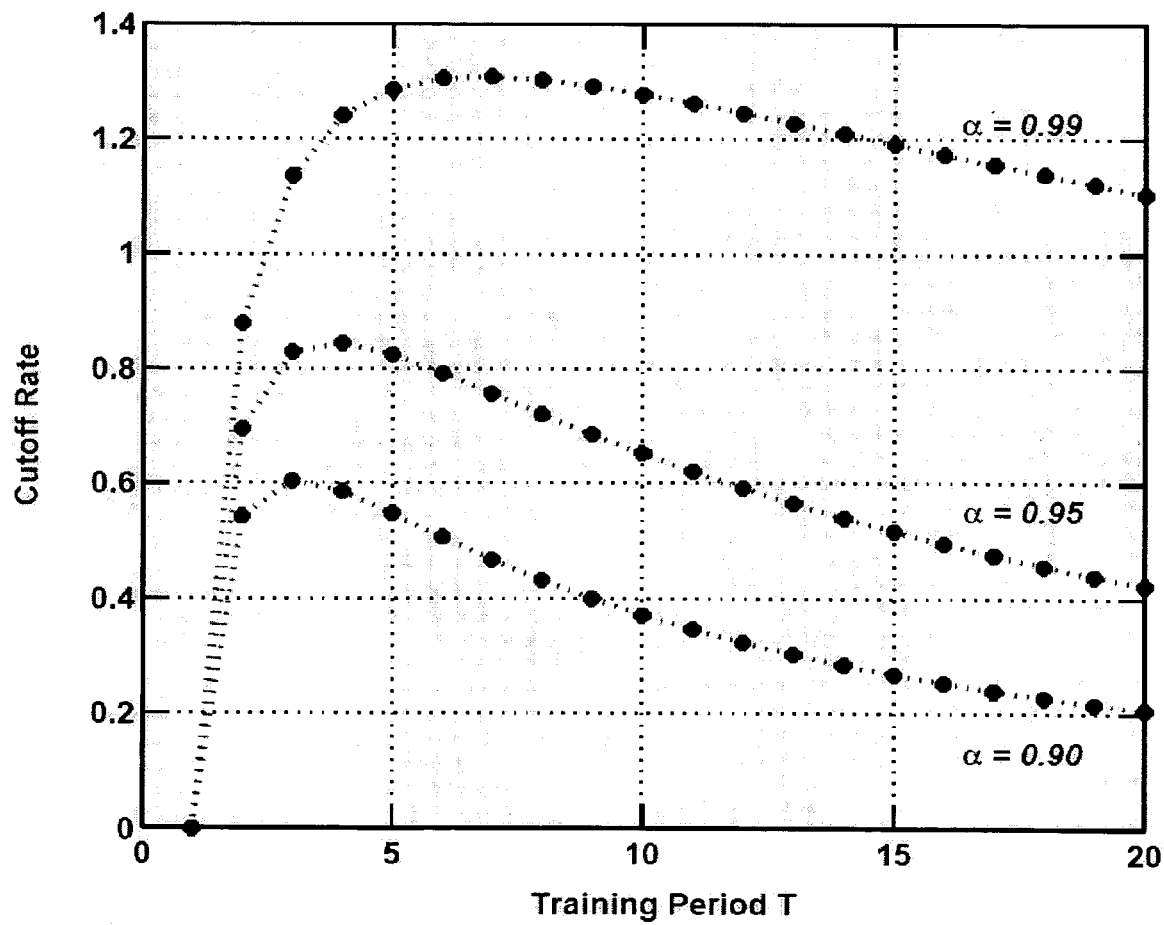
FIG. 7 is a graph of the QPSK cutoff rate for various periods in an exemplary embodiment of the allocation of training symbols of FIG. 2.

The effect of optimal training on the cutoff rate can now be examined. Referring to FIG. 6 the QPSK cutoff rate under the (1,0) estimator for Doppler values $\alpha=\{0.90, 0.95, 0.99\}$ can be plotted. For fixed $\alpha$, the cutoff rate can be plotted under: (a) optimization over the energy allocation and training period $\kappa_P=\kappa_P^*$, $\kappa_D=\kappa_D^*$, and $T=T^*$; (b) optimization over the training period but not the energy allocation, $T=T^*$, $\kappa_D=\kappa_P=\kappa_{av}$; and (c) the unoptimized case, $\kappa_D=\kappa_P=\kappa_{av}$, $T=T_C$ (the training period can be fixed at the high SNR optimal value determined from (30)). The merits of optimal allocation increase with the channel predictability: when $\alpha=0.99$ there can be a ~2 dB gain at $\kappa_{av}=0$ dB, but when $\alpha=0.9$ the gain can be only a fraction of a dB. In each case, the energy allocation, not the assignment of the training period, provides most of the gain in optimized training. This is due in part to the choice of $T=T_C$, which can be optimal at high SNR. Referring to FIG. 7, the impact of an arbitrary choice of T on the cutoff rate under constant energy allocation $\kappa_D=\kappa_P=\kappa_{av}=20$ dB can be plotted. The degradation can be significant when T is chosen suboptimally.

Figure 8:
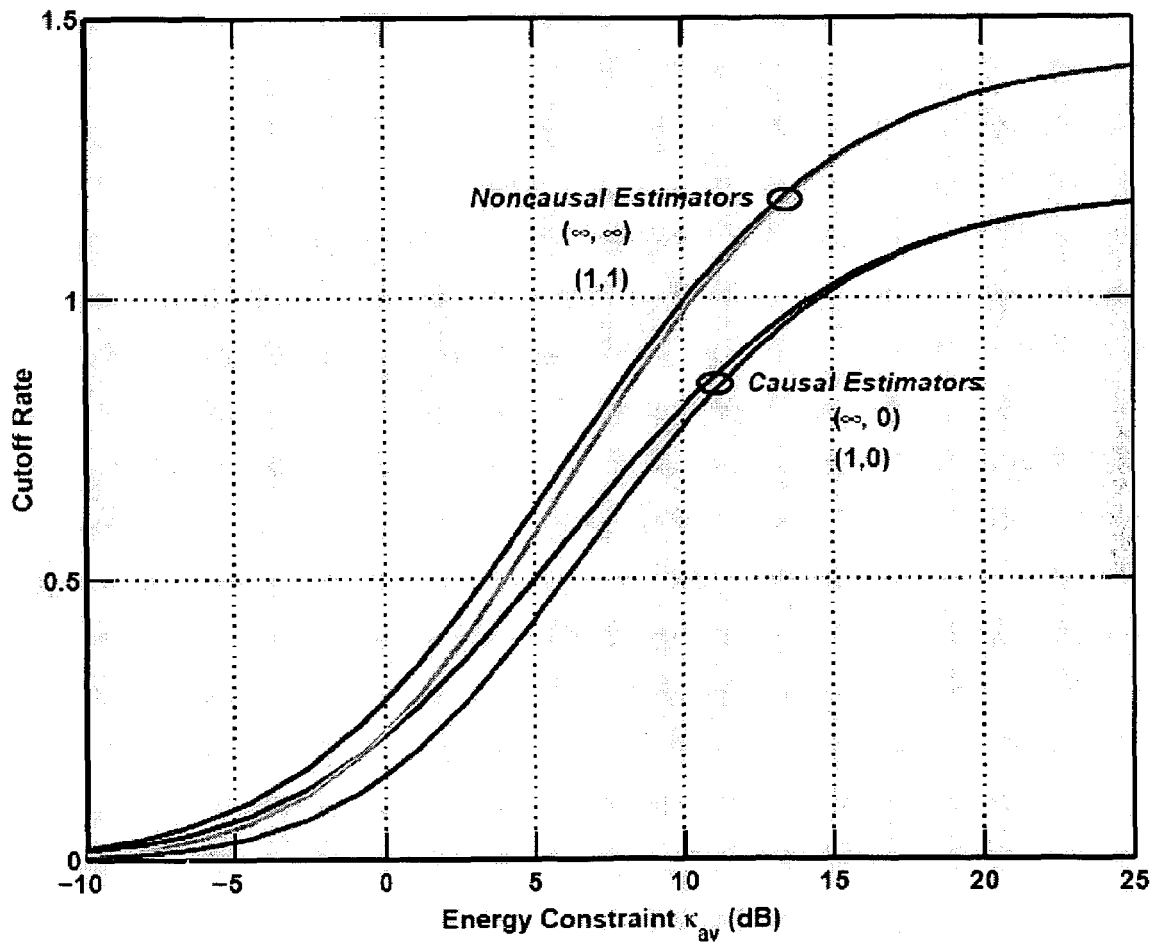
FIG. 8 is a graph of the cutoff rate for causal and noncausal estimators in an exemplary embodiment of the allocation of training symbols of FIG. 2.
Figure 9:
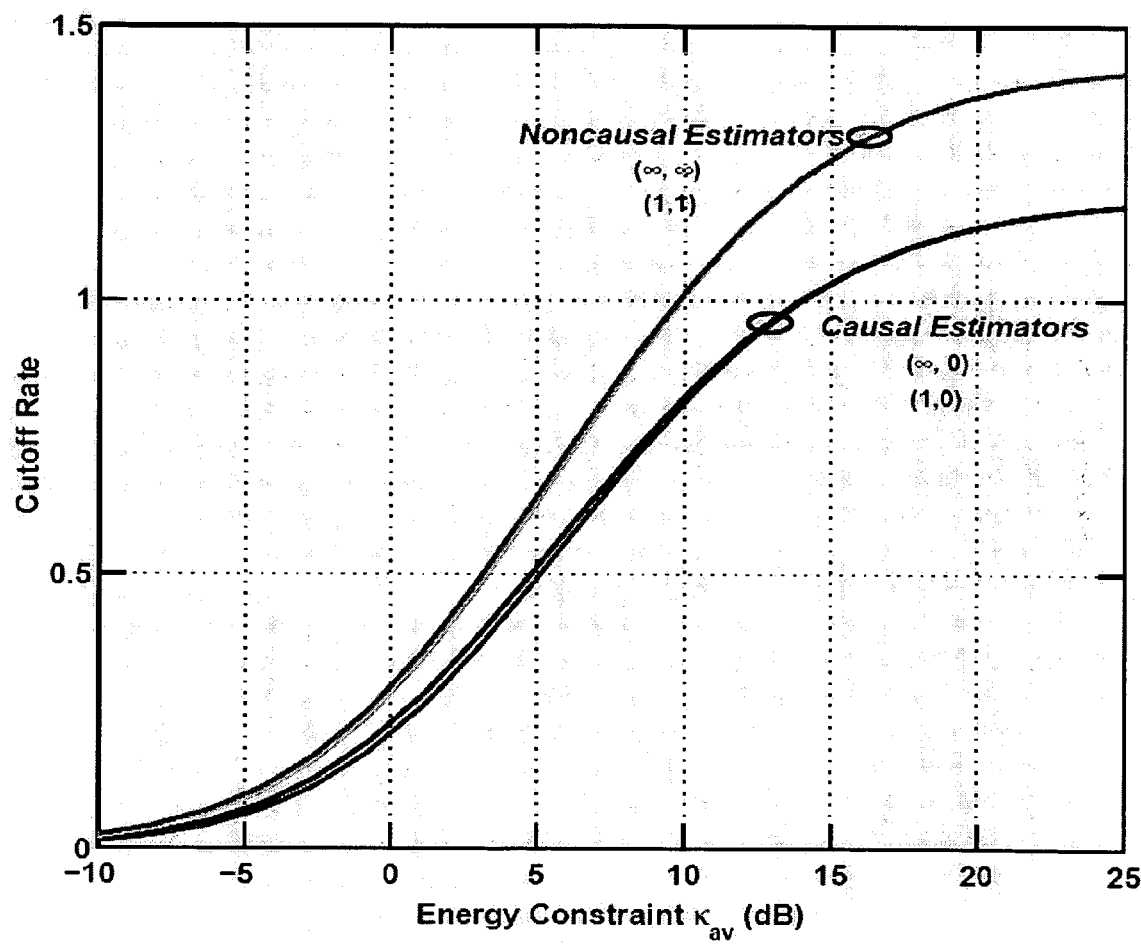
FIG. 9 is a graph of the cutoff rate for causal and noncausal estimators with optimized energy and training assignments in an exemplary embodiment of the allocation of training symbols of FIG. 2.

To determine the merits of more sophisticated estimators, the cutoff rate can be compared under the simplest and the most complex causal ((1,0) and ($\infty$,0)) and noncausal ((1,0) and ($\infty$,$\infty$)) estimators in FIG. 8 for $\alpha=0.98$ and a constant energy allocation with unoptomized choice of T (T=$T_C$ for the causal estimators or T=$T_{NC}$ for the noncausal estimators). Therefore, the curves in the figure can represent the largest increase in cutoff rate due to the use of a sophisticated estimator in place of a simpler one. At small SNR there can be ~2 dB gain in using more sophisticated estimators. However, this gain can diminish at high SNR (as expected for the GM model). The figure can be repeated with optimized energy and training assignments in FIG. 9. The energy savings for using the ($\infty$,0) estimator in place of the (1,0) (or the ($\infty$,$\infty$) in place of the (1,1)) can be a fraction of a dB over the entire SNR range. Energy optimization reduces the need for sophisticated estimators in the GM model.

Next, optimized training for a Jakes channel correlation model can be analyzed. While the GM model provides straightforward analytic results, the Jakes model is known to be an accurate and experimentally validated model in dense scattering environments. The analysis using the Jakes model can be used to validate and refine the design paradigms derived above. For the Jakes model, $$R_h(\tau) = J_0(2\pi f_D T_D \tau) \quad (32)$$

where $J_0(.)$ is the zero-order Bessel function of the first kind, and $f_D T_D > 0$ is the normalized Doppler parameter. The cutoff rate is given by (14) with CSI Quality (6) as before, but now under the channel correlation of (32). In the following simulations, mobile speeds of {12, 60, 120} Km/h are used which correspond to the Doppler parameters $$f_D T_D = \left\{ \frac{1}{100}, \frac{1}{20}, \frac{1}{10} \right\}$$

at a carrier frequency of 900 MHz and symbol period of $T_D=1$ msec.

Figure 10:
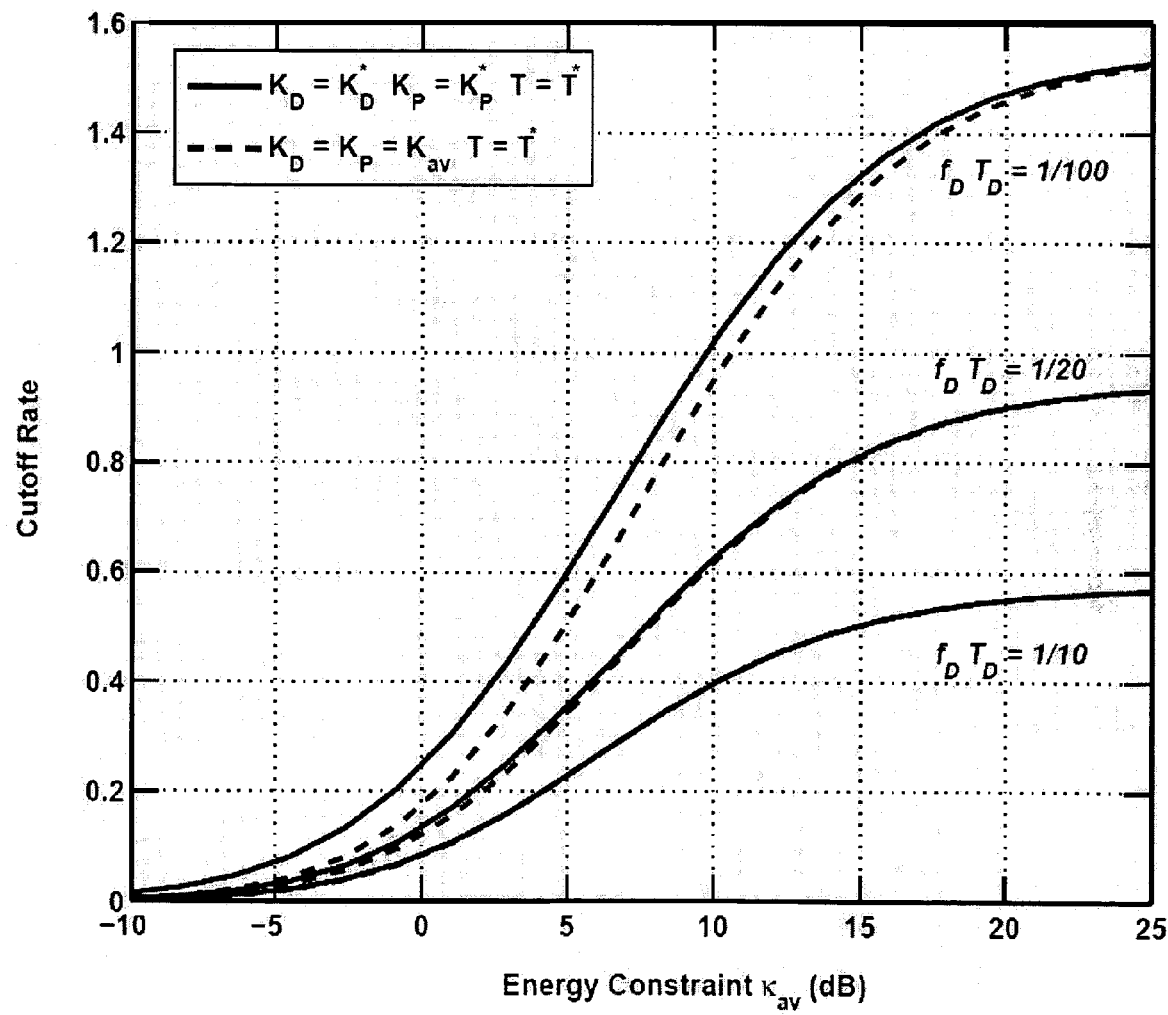
FIG. 10 is a graph of the cutoff rate for Doppler parameters of an exemplary embodiment of the allocation of training symbols of FIG. 2.

Referring to FIG. 10, the cutoff rate can be plotted for three values of $f_D T_D$ under optimized energy and training period assignments $\kappa_P = \kappa_P^*$, $\kappa_D = \kappa_D^*$, $T=T^*$ and under the optimized training period only $\kappa_P = \kappa_D = \kappa_{av}$, $T=T^*$. Behavior can be seen to be qualitatively similar to that in FIG. 3(a) for the GM model: energy-optimized training can provide a noticeable increase in the cutoff rate for slower fading channels, but not for rapidly fading channels. Further, optimized training provides the largest savings at low SNR (~2 dB at $\kappa_{av}=0$ dB), but can be asymptotically of no benefit (as SNR→∞).

Figure 11:
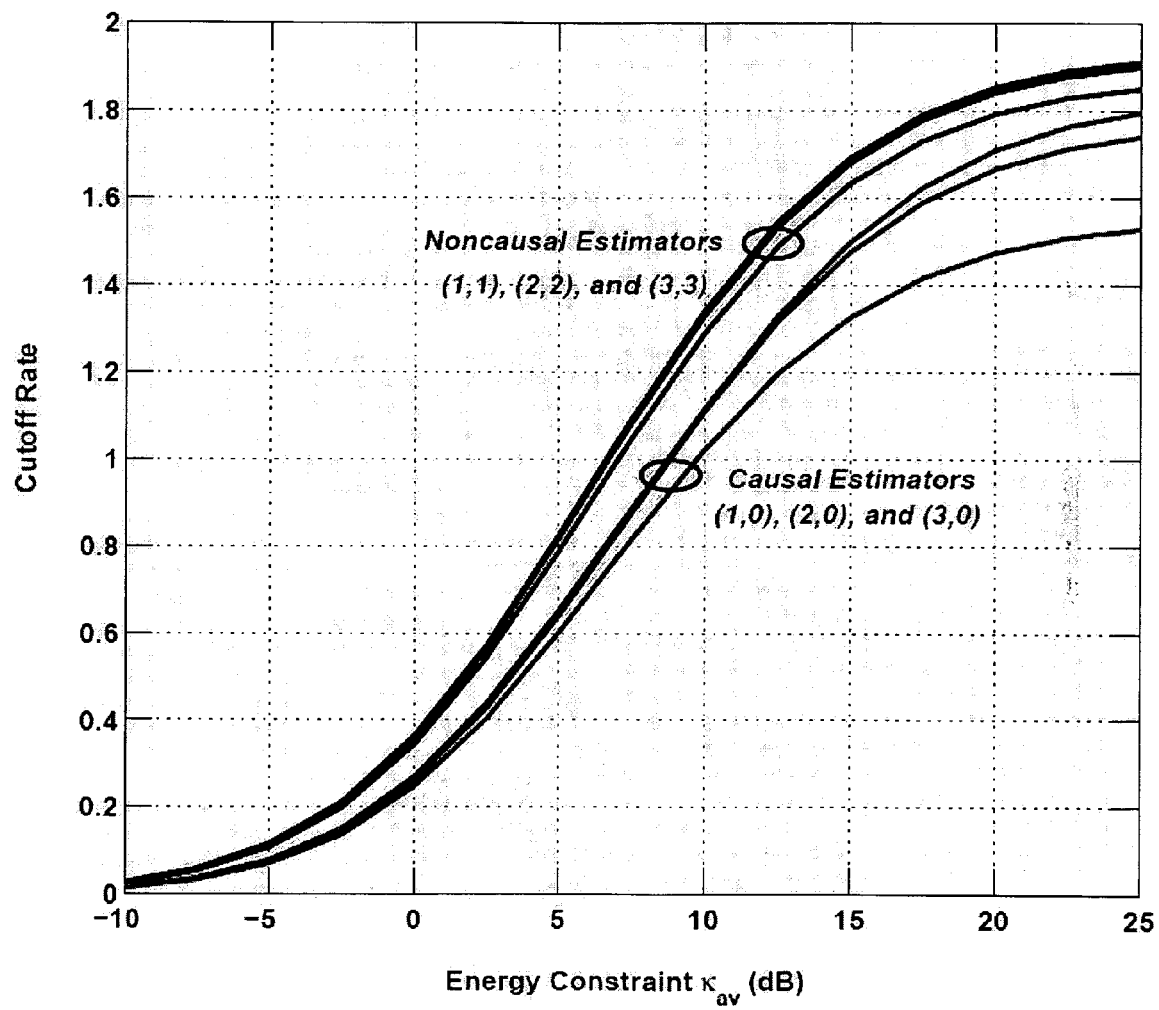
FIG. 11 is a graph of the cutoff rate for QPSK input and optimized training of an exemplary embodiment of the allocation of training symbols of FIG. 2.

The Markov property of a communication channel can be used in several instances, exploiting the convergence of the (L,0) estimator to the (1,0) estimator (alt., the (L,M) estimator to the (1,1) estimator) at high SNR. To test the degree to which this property holds under the Jakes model, the cutoff rate for QPSK input and optimized training (both the energy and training period have been optimized) can be plotted in FIG. 11. In comparison to FIG. 9, the counterpart figure for the GM model, a similar qualitative behavior can occur at low SNR. However, differences can appear at high SNR: more sophisticated estimators can be useful at high SNR under optimized training (for both causal and noncausal estimation). For example, there can now be a ~3 dB gain in going from the (1, 0) estimator to the (2, 0) estimator at an SNR of $\kappa_{av}=15$ dB. Further, performance of the (L, 0) (alt., (L, M)) estimator does not converge to that of the (1, 0) (alt., (1, 1)) estimator at high SNR. In general, the largest gain can be achieved in going from the (1, 0) estimator to the (2, 0) estimator (alt., from the (1, 1) to the (2, 2)), after which adding more pilots provides diminishing returns to the cutoff rate.

The process using the cutoff rate to allocate resources in a communication channel, as described in detail above, is updated over a configurable time period. The training scheme can be updated whenever there is reason to believe that the statistical properties of the underlying communications channel have changed. For example, if a user of a communication channel is driving around in a rural area, the statistical properties of the channel will not change often, and the scheme does not need to be updated often. If the user is driving in and out of urban and rural environments, the statistical properties of the channel will change rapidly, and the scheme needs to be updated more frequently.

Embodiments of the present invention can be implemented in hardware, software, firmware, or a combination thereof. In the preferred embodiment(s), the determination of the cutoff rate and the allocation of training symbols is implemented in software or firmware that is stored in a memory and that is executed by a suitable instruction execution system. If implemented in hardware, as in an alternative embodiment, the determination of the cutoff rate and the allocation of training symbols can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The flow chart of FIGS. 1 and 2 show the architecture, functionality, and operation of a possible implementation of a software implementation. In this regard, each block represents a module, segment, or portion of code, which comprises one or more executable instructions for implementing the specified logical function(s). It should also be noted that in some alternative implementations, the functions noted in the blocks may occur out of the order noted in FIGS. 1 and 2. For example, two blocks shown in succession in FIG. 2 may in fact be executed substantially concurrently or the blocks may sometimes be executed in the reverse order, depending upon the functionality involved.

The software program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present invention includes embodying the functionality of the preferred embodiments of the present invention in logic embodied in hardware or software-configured mediums.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method of communications comprising:
   determining the cutoff rate of a communication channel by analyzing an arbitrary channel correlation and a training and estimation scheme wherein the cutoff rate ($R_O$) is determined from equation (14);

$$R_o = -\frac{1}{T}\sum_{l=1}^{T-1} \log_2\left[\frac{1}{M}\sum_{m=0}^{M-1} \frac{1+K_D(1-\omega_l)}{1+K_D\left(1-\omega_l\cos^2\left(\frac{\pi m}{M}\right)\right)}\right]$$

wherein the estimation scheme is adjusted by applying the analysis of causal and noncausal estimators to the model of the communication channel; and
   allocating resources for the communication channel corresponding to maximization of the cutoff rate.

2. The method of claim 1, wherein allocating resources comprises allocating power and bandwidth of the communication channel to training symbols.

3. The method of claim 1, wherein the communication channel is a rapidly varying channel.

4. The method of claim 1, wherein the training and estimation scheme is Pilot Symbol Assisted Modulation (PSAM).

5. The method of claim 4, wherein PSAM is applied to a channel correlation model of the communication channel.

6. A system for communications comprising:
   receiver adapted to sample a transmission on a communications channel;
   processor adapted to determine the cutoff rate of the communication channel by analyzing an arbitrary channel correlation function and estimation scheme wherein the cutoff rate ($R_O$) is determined from equation (14)

$$R_o = -\frac{1}{T}\sum_{l=1}^{T-1} \log_2\left[\frac{1}{M}\sum_{m=0}^{M-1} \frac{1+K_D(1-\omega_l)}{1+K_D\left(1-\omega_l\cos^2\left(\frac{\pi m}{M}\right)\right)}\right]$$

and wherein the estimation scheme is adjusted by applying the analysis of causal and noncausal estimators to the model of the communication channel and;
   processor adapted to allocate resources for the communication channel corresponding to maximization of the cutoff rate.

7. The system of claim 6, wherein the processor adapted to allocate resources allocates the resources by allocating power and bandwidth of the communication channel to training symbols.

8. The system of claim 6, wherein the communication channel is a rapidly varying fading channel.

9. The system of claim 6, wherein the estimation scheme is Pilot Symbol Assisted Modulation (PSAM).

10. The system of claim 9, wherein PSAM is applied to a channel correlation model of the communication channel.

* * * * *